(12) United States Patent
Lewis et al.

(10) Patent No.: US 12,534,926 B2
(45) Date of Patent: Jan. 27, 2026

(54) AUTOMATIC DISCOVERY OF POOL PAD EQUIPMENT SYSTEM AND METHOD

(71) Applicant: Pentair Water Pool and Spa, Inc., Cary, NC (US)

(72) Inventors: Keith Lewis, New Hill, NC (US); Edgardo Rodriguez, Camarillo, CA (US); Ramsundar Mollyn, Moorpark, CA (US); Stephen Hirsch, Oxnard, CA (US); Carl Regan, Dunn, NC (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 95 days.

(21) Appl. No.: 18/393,467

(22) Filed: Dec. 21, 2023

(65) Prior Publication Data

US 2024/0209649 A1    Jun. 27, 2024

Related U.S. Application Data

(60) Provisional application No. 63/477,870, filed on Dec. 30, 2022, provisional application No. 63/435,237, filed on Dec. 24, 2022.

(51) Int. Cl.
*E04H 4/14* (2006.01)
*A61H 33/00* (2006.01)

(52) U.S. Cl.
CPC .............. *E04H 4/14* (2013.01); *A61H 33/005* (2013.01); *A61H 2033/0079* (2013.01)

(58) Field of Classification Search
CPC .................. E04H 4/14; A61H 33/005; A61H 2033/0079; H04L 67/51; H04L 67/12

USPC ....................................................... 4/488, 506
See application file for complete search history.

(56) References Cited

U.S. PATENT DOCUMENTS

| | | | | |
|---|---|---|---|---|
| 11,573,580 B2* | 2/2023 | Doyle | ................. | G05D 7/0664 |
| 11,579,637 B2* | 2/2023 | Doyle | ................. | F16K 37/0041 |
| 11,676,471 B2* | 6/2023 | Rogers | ................. | G06V 40/10 |
| | | | | 340/573.6 |

(Continued)

FOREIGN PATENT DOCUMENTS

| | | | | |
|---|---|---|---|---|
| CN | 115034773 A | * | 9/2022 | ........... A61H 33/005 |
| WO | WO-2014143779 A2 | * | 9/2014 | ........... A61H 33/005 |

OTHER PUBLICATIONS

European Search Report for European Patent Application No. 23219991.9-1213, dated Mar. 6, 2024, 11 pages.

*Primary Examiner* — Lori L Baker
(74) *Attorney, Agent, or Firm* — Husch Blackwell LLP

(57) ABSTRACT

A system and a method for automatically discovering one or more pool devices of a connected aquatic system. The one or more pool devices include one or more secondary panels and one or more pool components. A primary panel can broadcast a discovery message to identify the one or more secondary panels and/or the one or more pool components connected to the primary panel of the connected aquatic system. An identification response is generated and transmitted from the one or more secondary panels and/or the one or more pool components in response to the discovery message from the primary panel. The primary panel can receive and process the identification response and update a discovery status for each of the one or more secondary panels or the one or more pool components based on the identification response.

20 Claims, 10 Drawing Sheets

(56) References Cited

U.S. PATENT DOCUMENTS

| | | | |
|---|---|---|---|
| 11,720,085 B2* | 8/2023 | Roy | G01K 3/005 |
| | | | 700/275 |
| 12,085,553 B2* | 9/2024 | Hummer | G08B 21/08 |
| 2014/0303757 A1* | 10/2014 | Pruchniewski | H04L 41/0809 |
| | | | 700/90 |
| 2014/0336821 A1 | 11/2014 | Blaine et al. | |
| 2022/0351608 A1 | 11/2022 | Macey et al. | |
| 2024/0209649 A1* | 6/2024 | Lewis | H04L 67/51 |

* cited by examiner

AUTOMATIC DISCOVERY OF POOL PAD EQUIPMENT SYSTEM AND METHOD

RELATED APPLICATIONS

This application claims priority to U.S. Provisional Patent Application No. 63/435,237 filed on Dec. 24, 2022, and U.S. Provisional Patent Application No. 63/477,870 filed on Dec. 30, 2022, the entire disclosures of both applications are incorporated herein by reference.

FIELD OF THE INVENTION

The present disclosure relates to a system and method for automatically detecting and configuring pool and spa equipment.

BACKGROUND

In some pool and spa systems, pool devices, such as control panels, sub-control panels (e.g., secondary panels), and pool equipment, can be connected with each other. In existing systems, a technician manually evaluates whether a secondary panel and/or a pool component is connected or disconnected from the pool or spa system. Further, when a new secondary panel or a new pool component is deployed to the pool or spa system or an existing secondary panel, or an existing pool component gets disconnected from the pool or spa system, the technician has to manually evaluate if any secondary panel or pool component has been deployed to or is disconnected from the connected aquatic system. This manual evaluation of the secondary panel or the pool component by the technician is a time-consuming task and utilizes manual identification and configuration of the system components, which can lead to inefficiencies and human error.

Therefore, the art recognizes the need for a system and a method to automatically discover and identify a secondary panel or a pool component of a connected aquatic system. The art also recognizes the need for a system and a method that automatically discovers a secondary panel or a pool component during a boot process and after the boot process.

SUMMARY

In an aspect of the present disclosure, an automatic discovery method for automatically discovering and configuring one or more pool devices of a connected aquatic system is provided. The method can include broadcasting a discovery message to identify the one or more pool devices connected to a primary panel. The primary panel can be used to broadcast the discovery message to the one or more pool devices. The method can also include receiving and processing the discovery message by the one or more pool devices. The one or more pool devices can generate and transmit an identification response to the primary panel. The primary panel can receive the identification response from the one or more pool devices using a receiver of the primary panel. The primary panel can update a discovery status for each of the one or more pool devices using a processor of the primary panel. The primary panel can store the discovery status for each of the one or more pool devices in a memory of the primary panel.

In some aspects, the one or more pool devices are provided in a form of a pool component, a secondary panel, or a combination thereof. In some aspects, the secondary panel can be provided in a form of an indoor control panel, an expansion control panel, a wireless control panel, or a combination thereof. In some forms, the pool component can be provided in a form of a pool pump, a booster pump, a filter, a solar controller, a heater, a sanitizer, a water quality monitor, a salt/chlorine generator, a pH regulator, a valve, a pool cleaner, a pool skimmer, a pool light, a water feature, a pool drain, or a combination thereof. In some embodiments, the discovery status associated with a particular pool device is updated to "discovered" when the identification response is received from the particular pool device. The discovery status associated with the particular pool device that is "discovered" includes an "online" status. In some forms, the discovery status associated with a particular pool device is updated to "undiscovered" when the primary panel does not receive the identification response from the particular pool device in response to broadcasting the discovery message to the particular pool device. The discovery status associated with the particular pool device that is "undiscovered" includes an "offline" status.

In another aspect, a connected aquatic system designed to automatically discover and configure one or more pool devices of the connected aquatic system is provided. The connected aquatic system can include a primary panel and one or more pool devices connected to the primary panel. The primary panel can include a transmitter configured to broadcast a discovery message to identify the one or more pool devices connected to the primary panel. The primary panel can also include a receiver configured to receive an identification response from the one or more pool devices connected to the primary panel. The primary panel can also include a processor configured to update a discovery status for each of the one or more pool devices in response to receiving the identification response. The primary panel can also include a memory configured to store the discovery status for each of the one or more pool devices. The one or more pool devices can be provided in a form of a pool component, a secondary panel, or a combination thereof.

In some aspects, the primary panel is provided in a form of an outdoor control panel. the primary panel can further comprise one or more communication interfaces designed to communicatively couple the primary panel to the one or more pool devices. The one or more communication interfaces may be utilized for load balancing. In some forms, the connected aquatic system further includes a remote device operatively coupled to the primary panel. The remote device is configured to remotely control the one or more pool devices of the connected aquatic system. In some embodiments, the remote device is provided in a form of a mobile device, a smartwatch, a tablet, a computer, a laptop, or a combination thereof.

In another aspect, an automatic discovery method for automatically discovering and configuring one or more pool devices of a connected aquatic system is provided. The method can include broadcasting a discovery message to identify the one or more pool devices connected to a primary panel. The primary panel can be used to broadcast the discovery message to the one or more pool devices. The one or more pool devices can generate and transmit an identification response from the one or more pool devices in response to receiving the discovery message from the primary panel. The primary panel can update the discovery status for each of the one or more pool and spa devices when the primary panel receives the identification response. The discovery status can be updated to a discovered pool device for each of the one or more pool devices that generated and transmitted the identification response. The primary panel can also generate a unique identifier for each of the discovered pool devices. The primary panel can transmit the unique identifier to the discovered pool devices and receive an acknowledgment message from the discovered pool devices.

In some aspects, the primary panel can also store the discovery status for each of the one or more pool devices in a memory of the primary panel. In some embodiments, each of the one or more pool or spa devices can automatically self-configure by implementing the unique identifier received from the primary panel. In some forms, the method can further include broadcasting a request status to the one or more pool devices to check whether or not the one or more pool devices is alive. The primary panel can receive a reply status from the one or more pool devices in response to the request status. The primary panel can also update an alive status based on the reply status. In some embodiments, the unique identifier for each of the discovered pool devices corresponds to a media access control (MAC) address. In some forms, the method can also include balancing a load on the primary panel based on a number of the one or pool devices connected to a first interface of the primary panel and a second interface of the primary panel.

DETAILED DESCRIPTION

Figure 1:
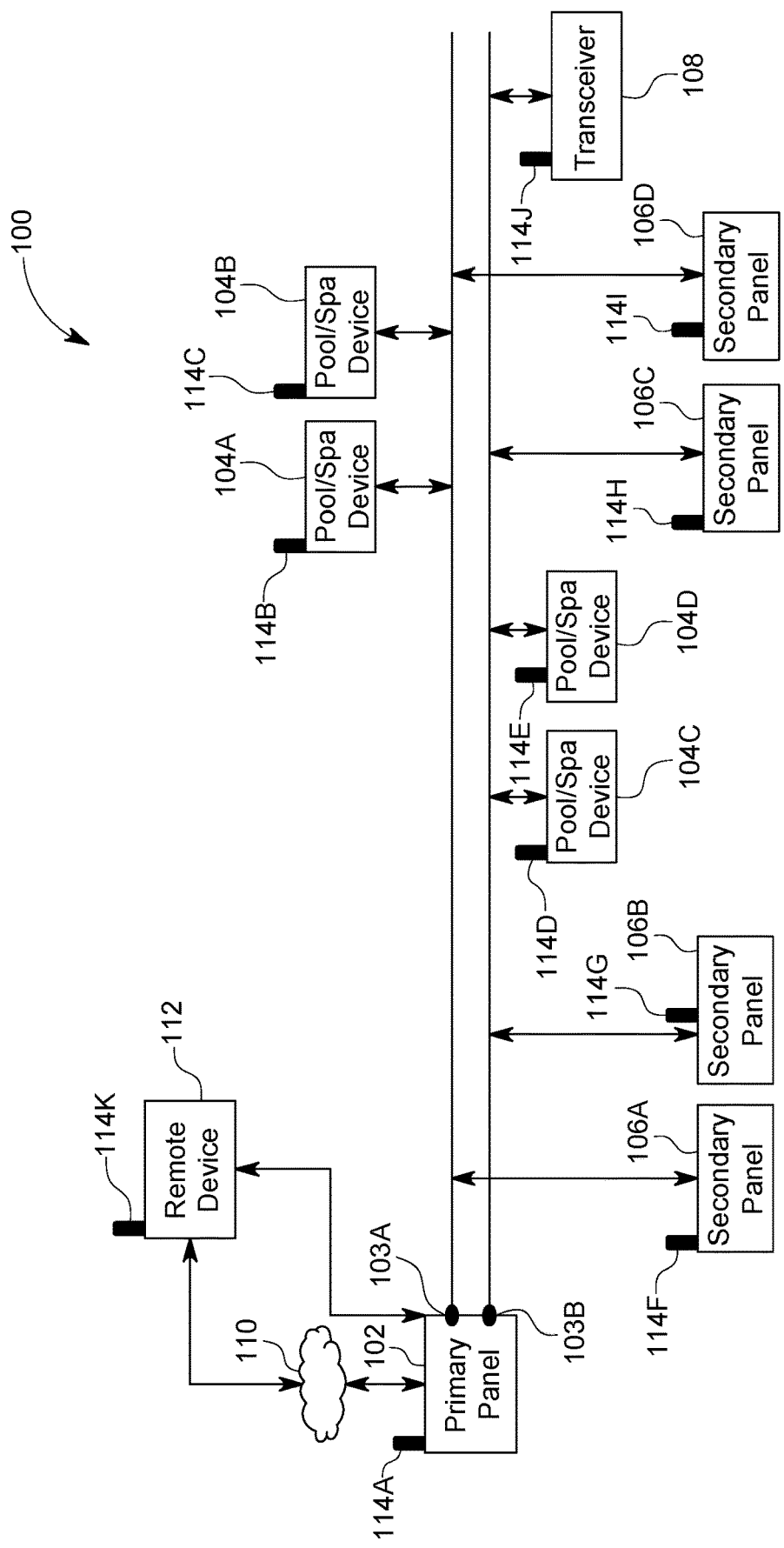
FIG. 1 is a schematic diagram of a system architecture for a connected aquatic system, according to disclosed embodiments.

Before any embodiments of the invention are explained in detail, it is to be understood that the invention is not limited in its application to the details of construction and the arrangement of components outlined in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connection supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Referring now to FIG. 1, a system architecture of a connected aquatic system 100 is shown, according to an embodiment. The connected aquatic system 100 can be provided in the form of multiple pool devices, including but not limited to, a primary panel 102, one or more pool components 104, one or more secondary panels 106, a transceiver 108, and a remote device 112. The one or more pool components 104 can include a first pool component 104A, a second pool component 104B, a third pool component 104C, and a fourth pool component 104D. Similarly, the one or more secondary panels 106 can include a first secondary panel 106A, a second secondary panel 106B, a third secondary panel 106C, and a fourth secondary panel 106D.

Furthermore, the primary panel 102 can include one or more communication interfaces 103 for connecting the primary panel 102 to each of the one or more pool components 104 and the one or more secondary panels 106. The one or more communication interfaces 103 of the primary panel 102 can include a first communication interface 103A and a second communication interface 103B. In some aspects, each of the one or more pool components 104 can include a communication interface. In some aspects, the one or more secondary panels 106 can include a communication interface. In some embodiments, each of the one or more pool components 104 and/or the one or more secondary panels 106 can include a single communication interface, which can be used to operatively connect to the first communication interface 103A, the second communication interface 103B, or a combination thereof.

In the example configuration shown in FIG. 1, the first communication interface 103A of the primary panel 102 is connected to a communication interface corresponding to each of the first pool component 104A, the second pool component 104B, the first secondary panel 106A, and the fourth secondary panel 106D. Also, the second communication interface 103B of the primary panel 102 can be connected to a communication interface corresponding to each of the third pool component 104C, the fourth pool component 104D, the second secondary panel 106B, the third secondary panel 106C, and the transceiver 108.

In some embodiments, the system can execute a load-balancing process based on load information for the first communication interface 103A, and the second communication interface 103B of the primary panel 102. The load information can include data associated with each of the pool components 104 and/or the secondary panels 106 connected to the first communication interface 103A and the second communication interface 103B. For example, if the system detects the fourth pool component 104D is connected to the second communication interface 103B of the primary panel 102, the system can determine the fourth pool component 104D is already connected, is not available to be connected, and that the second communication interface 103B has a load connected, with information about the connected load. When the next of the one or more pool components 104 needs connected, the system can retrieve and analyze the load information for both the first communication interface 103A and the second communication interface 103B to determine where to connect the next of the one or more components 104 to establish a balanced system load. In some forms, the system can automatically redistribute components between the first communication interface 103A, and the second communication interface 103B to allocate system resources and optimize the connected system.

The primary panel 102 may be communicatively coupled to the remote device 112 over a network 110 or by another communication connection. The remote device 112 is configured to remotely control the one or more pool components 104 of the connected aquatic system 100. A user may operate the remote device 112 to remotely control the one or more pool components 104 from a location remote from the one or more pool components 104. In some forms, the remote device 112 can include a user interface proximate to the one or more pool components 104. In some embodiments, the user may register the one or more pool components 104 to associate the one or more pool components 104 with the user and/or an account associated with the user (e.g., a user account). In some aspects, the user can register the one or more pool components 104 using a user interface, a mobile application, and/or the remote device 112.

In some embodiments, the remote device 112 can be provided in the form of a computing device capable of being connected to the internet. The computing device can be provided in the form of a mobile device, a smartphone, a smartwatch, a tablet, a computer, a laptop, a display screen, or any similar device. In some embodiments, the primary panel 102 is directly connected to the remote device 112, either wired or wirelessly, allowing direct communication with each other without using the network 110. The connection can be achieved through a peer-to-peer network or by connecting the primary panel 102 to the remote device 112 through a wired connection, wireless connection, or other communication connection.

In some embodiments, the communication connection(s) can include unified messaging protocol(s) to allow for future expansion and increased adaptability when detecting, adding, and configuring new system components 104. In some embodiments, the system components 104 can include a Wi-Fi module, or similar, to transmit data between the system components 104 and/or the primary panel 102 and/or the secondary panels 106 wirelessly, even if there is no internet connection. The communication between the system components 104 and/or the panels 102, and 106 can take place through the user's Wi-Fi router, or similar mesh system, using standard network protocols. The mesh network configuration can allow for direct communication in a mesh-connected system 100 without an internet collection and may allow for reduced traffic through a gateway while maintaining inter-device communication even if internet access is interrupted. In some embodiments, a master/slave configuration can be used to designate specific communication devices.

Each of the primary panel 102, the one or more pool components 104, the one or more secondary panels 106, the remote device 112, and the transceiver 108 are configured to communicate with each other wirelessly, through wired connections, using the network 110, or a combination thereof. In some embodiments, the communication connections can be provided in the form of an RS485 protocol, an Ethernet connection, etc.

In the non-limiting example shown in FIG. 1, the first communication interface 103A of the primary panel 102 is connected to the communication interface corresponding to each of the first pool component 104A, the second pool component 104B, the first secondary panel 106A, and the fourth secondary panel 106D. In this example, the second communication interface 103B of the primary panel 102 is connected to the communication interface corresponding to each of the third pool component 104C, the fourth pool component 104D, the second secondary panel 106B, the third secondary panel 106C and the transceiver 108.

In some aspects, each of the primary panel 102, the one or more pool components 104, the one or more secondary panels 106, the transceiver 108, the remote device 112, and the transceiver 108 may include an antenna 114. The antenna 114 can be configured to allow the devices and aspects of the connected system 100 to wirelessly communicate with one another. The primary panel 102 can include a first antenna 114A, the first pool component 104A can include a second antenna 114B, the second pool component 104B can include a third antenna 114C, the third pool component 104C can include a fourth antenna 114D, and the fourth pool component 104D can include a fifth antenna 114E. The first secondary panel 106A can include a sixth antenna 114F, the second secondary panel 106B can include a seventh antenna 114G, the third secondary panel 106C can include an eighth antenna 114H, and the fourth secondary panel 106D can include a ninth antenna 114I. In some forms, the transceiver 108 can include a tenth antenna 114J, and the remote device 112 can include an eleventh antenna 114K. In one non-limiting example, the first antenna 114A of the primary panel 102 may wirelessly transmit any information or other data to the first pool component 104A and the second antenna 114B may wirelessly receive such information from the primary panel 102. In some embodiments, the antennas 114 may be configured to send and receive information in response to commands, requests, or receiving information.

In some embodiments, the primary panel 102 of the connected aquatic system 100 can be provided in the form of an outdoor control panel. In some embodiments, the one or more secondary panels 106 of the connected aquatic system 100 can be provided in the form of an indoor control panel, an expansion control panel, a wireless control panel, or a combination thereof.

Figure 2:
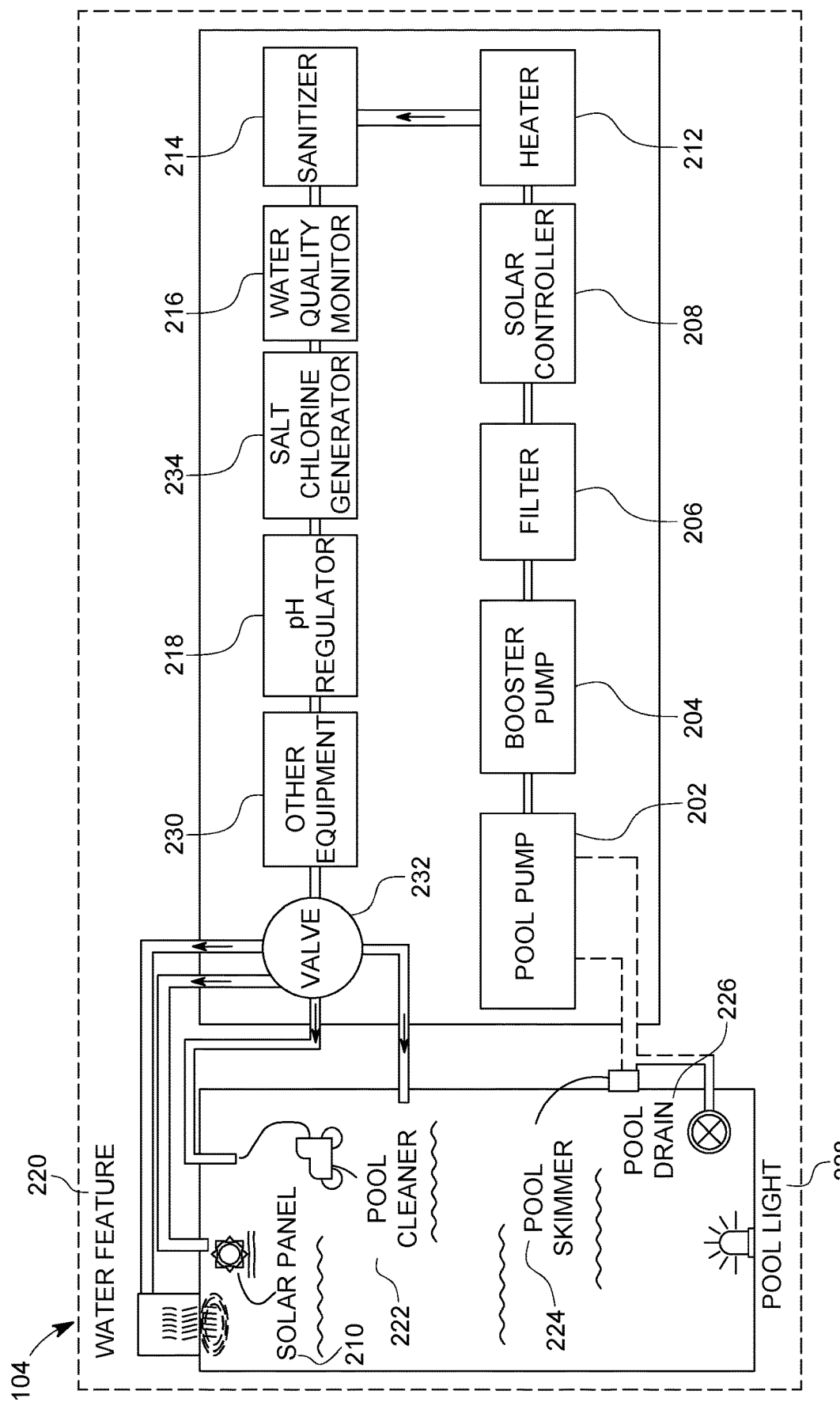
FIG. 2 is a schematic diagram of a pool component portion of the connected aquatic system of FIG. 1 according to disclosed embodiments.

FIG. 2 illustrates an example of the system components 104 that comprise an example aspect of a connected aquatic monitoring system according to disclosed embodiments. The system components 104 are provided in communication with each other and the pool or spa to form a fluid circuit. The fluid circuit facilitates water movement from the pool or spa through the system components 104 and the fluid circuit to accomplish various tasks including, for example, pumping, cleaning, heating, sanitizing, lighting, and similar. Additional arrangements of the connected system 100 besides those shown in FIGS. 1 and 2 are also contemplated.

The system components 104 can include one or more of the following devices utilized for operating and maintaining a residential aquatic system like a pool or spa a pool pump 202, a booster pump 204, a filter 206, a solar controller 208, one or more solar panels 210, a heater 212, a sanitizer 214, a water quality monitor 216, a pH regulator 218, a water feature 220, a pool cleaner 222, a pool skimmer 224, a pool drain 226, a pool light 228, a salt/chlorine generator 234, and other equipment 230. The system components 104 can further include one or more valves 232 to control the individual system components 104. The valves 232 can be controlled manually or remotely via the remote device 112, a central controller, individual system components 104, or any combination thereof.

In some aspects, each of the system components 104 can include an identification element. The identification element can be assigned by the manufacturer, include a product serial number, be assigned when a user registers the component, or otherwise be associated with a specific user account after installation. Each of the system components 104 can further include a sensing device. The sensing device can be provided in the form of an integrated sensor, an external sensor, a sensing unit coupled to or in communication with the system component 104, or a combination thereof. It will be understood by those having skill in the art that the term "sensing device" as used throughout the specification can include several different sensing devices, sensing device configurations, or other monitoring devices. This can include a sensor unit with an individual sensor, a sensor unit with multiple sensors, a single sensor with multiple sensing capabilities, or a combination thereof.

In various embodiments, a sensing device that is integrated with or removably attached to the system components 104 is designed to monitor the operating parameters of the system components 104. Multiple sensing devices can be installed based on the size, specifications, and complexity of the connected system 100 to collect accurate information. The sensing device(s) can be provided in the form of a power sensor, a temperature sensor, a pressure sensor, a gyro, an accelerometer, a vibration sensor, a flow sensor, a current sensor, a voltage sensor, a power sensor, a frequency sensor, an energy sensor, a fault sensor, an audio sensor, an optic sensor, or any combination thereof. Moreover, the sensing device can be connected to and designed to collect data from one of the system components 104, or in some examples, the sensing device can collect data from more than one of the system components 104. In this non-limiting example, the sensing device can further include different types of sensing components to collect and extract information related to operating parameters and send the data set to the central controller or another system component 104 via a wireless or wired connection. In some embodiments, the sensing device can be at a different geographic location than the central controller and/or the primary panel 102.

Each of the system components 104 can collect, send, and receive data sets to and from the other system components 104 using the antennas 114. The data sets collected and sent from the system components 104 can include, at least, specific component information from the manufacturer for the system component 104 and operating parameters. As described above, this can include information entered either directly or indirectly from the user, but can also include information from the manufacturer, such as routine maintenance schedules, system updates, or baseline settings. The data sets collected and sent via the system components 104 can further include operating parameters collected from the sensing device(s) associated with and connected to each of the system components 104.

The system components 104 shown in FIG. 2 can include an integrated sensing device or an external sensing device for collecting and/or extracting data sets associated with the identification element and operating parameters for the system component 104. Non-limiting examples of the system components 104 and the extracted data are described herein, but additional system components 104 and operating parameters will be recognized by those skilled in the art.

As a non-limiting example, the pool pump 202 and booster pump 204 can include one or more sensing devices designed to detect power, vibration, current, flow, pressure, temperature, frequency, or a combination thereof. The power sensor can measure when the pool pump 202 and booster pump 204 are connected to power, and whether the pump(s) are activated. Additionally, some pool pumps 202 and booster pumps 204 have a soft start mode or similar controlled or reduced power mode, which can be measured and detected by the power sensor. The vibration sensor can measure vibration levels to identify electromagnetic or mechanical imbalance, loose components, rubbing parts, part failure, cavitation, or resonance. Some embodiments can further include an accelerometer to detect if the device becomes unlevel. The current sensor can measure the current flowing through the pump(s) using a non-intrusive method. The flow sensor can measure the flow of water that is pumped by the motor of the pool pump 202 and the booster pump 204 and determines the actual health of the motor by determining if the flow rate is unexpectedly high or low based on the particular application and various threshold metrics. The flow sensor can also include a flow switch or a fluid velocity sensor to detect abnormal flow rates. The pressure sensor can monitor the pressure in air compressors, heat exchangers, and similar that all use pumps to push air or water through their respective systems. The pressure sensor can further measure an input and differential pressure at the head of the pool pump 202 or the booster pump 204. The sensing device can be designed to overcome the faults and monitor the pool pump 202 and booster pump 204. Further, the temperature sensor monitors the temperature and detects any abnormal temperature rise due to any malfunction or failure, this can include but is not limited to temperature measurements at the inlet, outlet, and motor. The frequency sensor can measure the frequency of the pool pump 202 and the booster pump 204 and can be used for controlling VFDs that can be associated with or connected to either the pool pump 202 or the booster pump 204. In some embodiments, an encoder can be used to measure and monitor the velocity of a rotor/impeller of the pool pump 202 and the booster pump 204. Other sensing devices, such as the voltage sensor, can monitor the input voltage and calculate the power factor of a motor of the pool pump 202 and the booster pump 204 using both current and voltage values of the connected system 100 or the values detected by the sensing devices connected to each of the pool pump 202 and the booster pump 204.

In another non-limiting example, the filter 206 can include a sensing device designed to detect pressure, flow, fluid velocity, or a combination thereof. The pressure sensor can detect and monitor differential pressure to identify when the filter 206 can be dirty or clogged with debris. Routine maintenance alerts can be provided to regularly clean the filter 206 and extend the life of the filter 206. The flow sensor can include a flow switch or a fluid velocity sensor to measure the flow status and flow rate at the inlet, outlet, and backwash ports of the filter 206. Additionally, the flow sensor can measure the flow rate to detect potential leaks in the filter 206 and a filter compartment (not shown).

In another non-limiting example, the solar controller 208 can include a sensing device designed to detect power, voltage, current, temperature, or a combination thereof. The power sensor can determine when the solar controller 208 is connected to power, and whether it is activated. The voltage sensor can monitor the input voltage and detect any upstream electrical system faults. The voltage sensor can also measure the control voltage and verify the output signal to a solar valve actuator is within range (e.g., ~0-24V), and can verify the solar controller 208 relay voltage is within range (e.g., ~0-230 VAC). The temperature sensor can be used to monitor an internal temperature of the solar controller 208 and identify if any internal components, including electronic components, are overheating.

In another non-limiting example, the solar panels 210 can include a sensing device designed to detect power, voltage, current, solar radiation, or a combination thereof. The power sensor can measure when the solar panels 210 are activated. The voltage and current sensors can be used to detect power generation and the power output of the solar panels 210. In addition to the data analytics techniques described herein, the data collected by the sensing device(s) can be used to produce energy reports and historical usage data on the remote device 112. The data can also be used by the other system components 104 to evaluate performance and propose updates. A photosensor can be used to detect levels of solar radiation (e.g., whether it is a sunny day or a cloudy day).

In another non-limiting example, the heater 212 can include a sensing device designed to detect power, voltage, current, temperature, pressure, or a combination thereof. The power sensor can measure when the heater 212 is connected to power, and whether it is activated. The voltage sensor can monitor the input voltage and detect any upstream electrical system faults. The voltage sensor can also measure voltage drop to determine the power consumption of the heater 212. The current sensor can detect potential shorts in the heater 212 by identifying abnormal power consumption or current spikes. The temperature sensor can be used to monitor the internal temperature of the heater 212 including the heating elements (not shown). The temperature sensor can also measure the temperature at an inlet and an outlet to verify the water temperature is being heated according to the heater 212 controls and settings. The pressure sensor can measure differential pressure to identify scale or fouling through a water passage in the heater 212.

In another non-limiting example, the sanitizer 214 can include a sensing device designed to detect power, radiant energy, resistance, voltage, current, pressure, or a combination thereof. The power sensor can measure when the sanitizer 214 is connected to power, and whether it is activated. In some embodiments, the sanitizer 214 is an Ultraviolet ("UV") Light sanitizing device and a photosensor can be used to measure the radiant energy of the sanitizer 214 to also determine if the sanitizer 214 is activated. The resistance sensor can determine the electrical resistance across the UV bulb to verify the bulb is properly installed and within a functional range. Irregular resistance measurements can indicate a replacement bulb should be installed for the sanitizer 214. The voltage sensor can monitor an input voltage and detect any upstream electrical system faults. The voltage sensor can also measure voltage drop to determine the power consumption of the sanitizer 214. The current sensor can measure the current in the sanitizer 214 system to verify the circuit is working properly. Low or non-existent current measurements can indicate a replacement bulb should be installed for the sanitizer 214. The pressure sensor measures differential pressure to detect scale or fouling through a water passage in the sanitizer 214.

In another non-limiting example, the water quality monitor 216 can include a sensing device designed to detect power, voltage, flow, resistance, water chemistry, or a combination thereof. The power sensor can measure when the water quality monitor 216 is connected to power, and whether it is activated. The voltage sensor can monitor the input voltage and detect any upstream electrical system faults. The voltage sensor can also measure a battery level if the water quality monitor 216 is battery-powered or includes a battery pack. The flow sensor can also include a flow switch and can monitor water flow at an input and an output of the water quality monitor 216 and can identify potential clogs in the monitoring system. The flow sensor can further determine if the flow velocity is sufficient for proper operating conditions for the water quality monitor 216.

In another non-limiting example, the pH regulator 218 can include a sensing device designed to detect power, voltage, current, level, chemistry, flow, or a combination thereof. The power sensor can measure when the pH regulator 218 is connected to power, and whether it is activated. The voltage sensor can monitor the input voltage and detect any upstream electrical system faults. The current sensor can measure the current in the pH regulator 218 system to verify the circuit is working properly. Abnormal current measurements or an abnormal power consumption reading can indicate a malfunction. A chemical tank level associated with the pH regulator 218 can be measured by a level sensor, such as but not limited to a float switch, force sensor, or similar. The chemical sensor can be used to identify chemical properties within the chemical tank. In some embodiments, one or more electrodes, or similar, can be used to measure a difference in the electrical potential between a pH electrode and a reference electrode. The flow sensor can include a flow switch or a fluid velocity sensor to measure the rate at which chemicals are dispensed through the pH regulator 218 system. In some embodiments, the flow sensor can also be integrated with, or otherwise communicate with, the chemical sensor to measure the type and quantity of chemical(s) dispensed. In some embodiments, an encoder can be used to measure, monitor, or detect the rotational position and velocity of a dispensing component of the pH regulator 218.

In another non-limiting example, the water feature 220 can include a sensing device designed to detect power, flow, pressure, or a combination thereof. The power sensor can measure when the water feature 220 is connected to power, and whether it is activated. The flow sensor can include a flow switch, a fluid velocity sensor, or similar, to measure the flow rate through the water feature 220. The pressure sensor can be used to detect a water depth at a bottom surface of the water feature 220. The pressure sensor can also communicate with the flow sensor to measure the flow rate through the water feature 220.

In another non-limiting example, the pool cleaner 222 can include a sensing device designed to detect power, voltage, pressure, or a combination thereof. The sensing device can also determine if debris should be emptied from the cleaner. The power sensor can measure when the pool cleaner 222 is connected to power, and whether it is activated. The voltage sensor can monitor the input voltage and detect any upstream electrical system faults. The pressure sensor can measure a suction level in a suction line of the pool cleaner 222. An encoder can be used to detect whether one or more spinning motors of the pool cleaner 222 are rotating properly. As with the other system components 104 described herein, the monitored measurements can vary depending on the manufacturer and type of pool cleaner 222.

In another non-limiting example, the pool skimmer 224 can include a sensing device designed to detect pressure. A differential pressure sensor can detect if there is a clog in a skimmer basket of the pool skimmer 224 or if debris is interfering with air being induced in an equalizer line of the pool skimmer 224. In some embodiments, an encoder can be used to detect a position of a weir installed in the pool skimmer 224.

In another non-limiting example, the pool drain 226 can include a sensing device designed to detect temperature, flow, pressure, or a combination thereof. The temperature sensor can measure the temperature of the water output flowing through the pool drain 226. The flow sensor can include a flow switch, a fluid velocity sensor, or similar, to measure the flow rate of water through the pool drain 226. The pressure sensor can measure a pool water level. The pressure sensor can also measure a differential pressure to detect if the pool drain 226 may be clogged.

In another non-limiting example, the pool light 228 can include a sensing device designed to detect power, voltage, current, resistance, or a combination thereof. The power sensor can measure when the pool light 228 is connected to power, and whether it is activated. The voltage sensor can measure the input voltage to the pool light 228 and detect any upstream electrical system faults. The current sensor can measure the current through the pool light 228 and can be used with the voltage sensor to measure power consumption. The voltage sensor or the current sensor can also detect when there is an abnormal power consumption measurement, which can indicate a malfunction with the pool light 228. In some embodiments, the pool light 228 can include multiple pool lights and can also include advanced lighting controls such as animation, color, dimming, timer controls, etc. The advanced lighting control features for the pool light 228 can include a sensing device to detect and measure system variables or other operating parameters associated with the one or more lighting control features. In some embodiments, the resistance can also be measured to identify electrical shorts, faults, or when a light bulb or diode should be replaced.

In another non-limiting example, the valve(s) 232 can include a sensing device designed to detect voltage, current, position, flow, or a combination thereof. The voltage sensor can monitor the input voltage and detect any upstream electrical system faults. The voltage sensor can also measure the control voltage and verify the output signal to a valve actuator is within range (e.g., ~0-24V). The current sensor can measure the current in the valve system and detect if there is an abnormal current measurement. Abnormal current measurements or an abnormal power consumption reading can indicate a malfunction in the valve(s) 232. The position of a valve actuator or shaft can be detected using a position sensor, encoder, or similar. The flow switch can measure the flow rate through the valve(s) 232 and detect if a valve port is not receiving an expected flow.

In another non-limiting example, the other equipment 230 can include a sensing device designed to detect operating parameters associated with components of the other equipment 330 (e.g., power status, operational mode, flow, pressure, chemical composition, calibration status, and other parameters). In some forms, the other equipment 230 may be provided in the form of one or more plug-and-play devices.

In another non-limiting example, the salt/chlorine generator 234 can include a sensing device designed to detect power, voltage, flow, resistance, water chemistry, or a combination thereof. The power sensor can measure when the salt/chlorine generator 234 is connected to power, and whether it is activated. The voltage sensor can monitor the input voltage and detect any upstream electrical system faults. The voltage sensor can also measure a battery level if the salt/chlorine generator 234 is battery-powered or includes a battery pack. The flow sensor can also include a flow switch and can monitor water flow at an input and an output of the salt/chlorine generator 234 and can identify potential clogs in the generator system. The flow sensor can further determine if the flow velocity is sufficient for proper operating conditions for the salt/chlorine generator 234.

In one embodiment, the sensing device (e.g., any of the sensing components, sensors, or other monitoring devices discussed above) can send data sets associated with the operating parameters and historical data of the system components 104 continuously, or substantially continuously, at scheduled intervals, or in response to a request or other system event. In this example, the request or system event can include user input received by the remote device 112. For example, a user can check the temperature of the pool or spa using the remote device 112. The remote device 112 could receive the temperature request and transmit a command to a sensor in communication with the pool or spa water, to collect the current temperature reading, transmit the information back to the remote device 112, and process the data sets to generate a display on the remote device 112.

Figure 3:
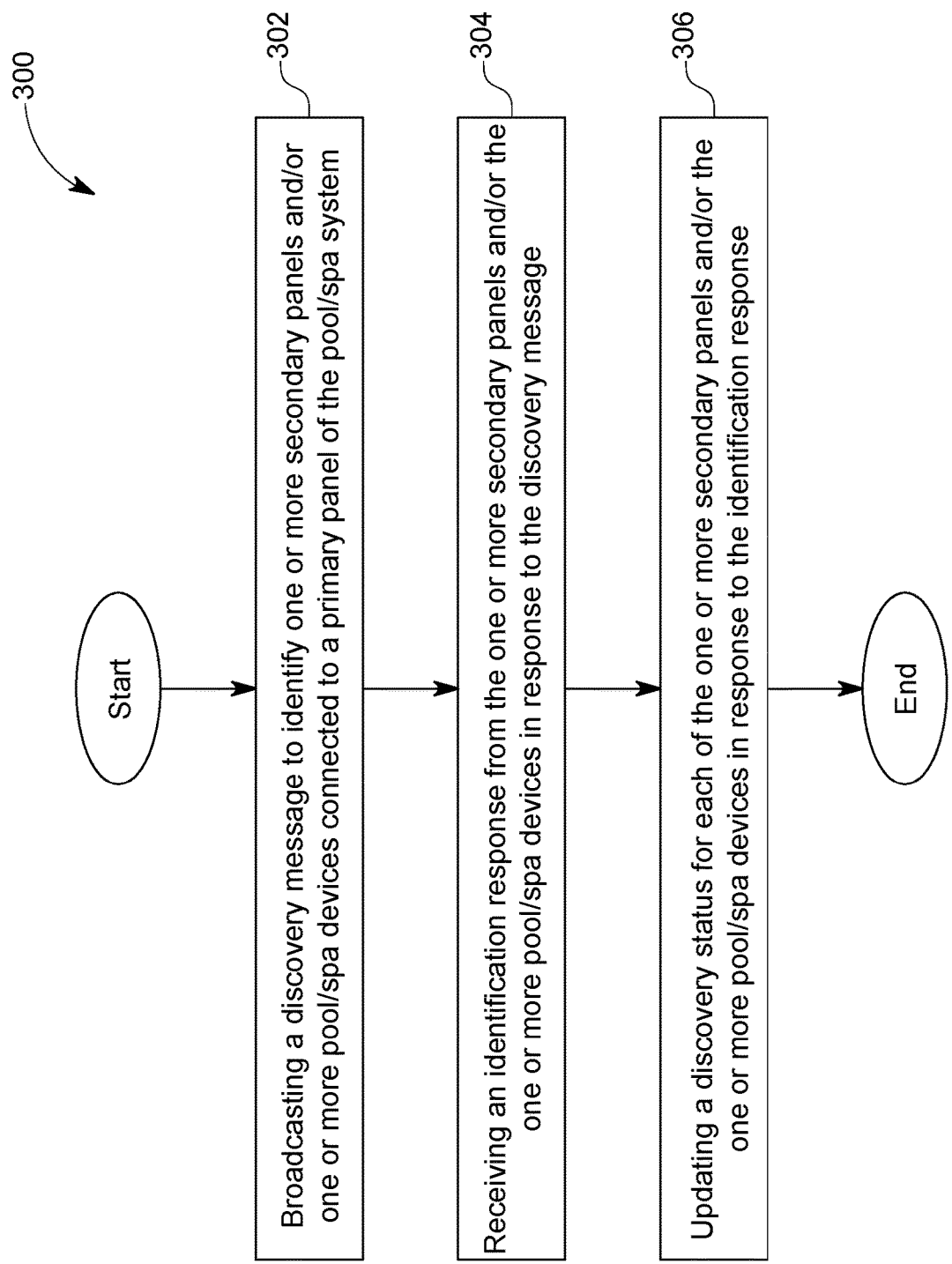
FIG. 3 is a flow diagram of a method for automatically discovering secondary panels or pool components of the connected aquatic system of FIG. 1, according to disclosed embodiments.

Referring to FIG. 3, a method 300 for automatically discovering the one or more secondary panels 106 and/or the one or more pool components 104 of the connected aquatic system 100 is provided. The primary panel 102 broadcasts a discovery message to identify one or more secondary panels 106 and/or one or more pool components 104 at step 302. In some embodiments, the one or more secondary panels 106 and/or one or more pool components 104 are connected to the primary panel 102 of the connected aquatic system 100 using a legacy protocol (e.g., RS-485).

In some aspects, the discovery message is a message broadcast to check "WHO IS THERE" (e.g., whether the secondary panel and/or the pool component is connected) in the connected aquatic system 100. In one embodiment, the discovery message broadcast by the primary panel 102 is provided in the form of the message format shown in exemplary Table 1 below:

TABLE 1

| FRAME | |
| --- | --- |
| PREAMBLE<br>FF 00 FF A5 | PAYLOAD |

Exemplary Table 1 includes a frame comprising a preamble and a payload. The preamble "FF 00 FF A5" refers to a unique proprietary signature of RS-485 kernel communication which is used to identify a start of a frame if an RS-485 line is tapped on with a communication system and data is transmitted over the 485 wired network.

The payload of the frame is provided in the form of the format in exemplary Table 2:

TABLE 2

| PAYLOAD | | | | | | |
|---|---|---|---|---|---|---|
| House | DST | SRC | OP CODE | Data Length | Data = Packet | Check Sum |
| 1 Byte | 1 Byte | 1 Byte | 1 Byte | 1 Byte | N Bytes (0-48) | 2 Bytes |

Exemplary Table 2 includes the payload comprising a house (of 1 byte), DST (of 1 byte), an SRC (of 1 byte), OP CODE (of 1 byte), Data Length (of 1 byte), Packet (of N (i.e., 0-48) bytes), and a Check Sum (of 2 bytes).

The term "House" is used to identify a physical location of a pool control system. For example, neighbors may have homes adjacent to one another. If two homes are close to one another and have the same pool control system, the "House" field can be used to identify the primary house associated with a particular wireless control panel sub-panel. In this example, even if the two homes have individual wireless control panels and the wireless control panel has wireless communication with a range that may be able to reach the other second home, the "House" identification number eliminates crossover between the controls of the pool control systems for both houses.

The "DST" value includes a destination address used to identify a target panel for the message when a command is transmitted.

The "SRC" value includes a source address used to identify a source panel when a command is transmitted. Each panel has a unique address number (e.g., 1 to 255). The protocol can use the SRC value to know which of the system components 104 and/or panels 102, 106 is the source ("SRC") of a message and which of the system components 104 and/or panels 102,106 is the destination ("DST"). In some aspects, the communication protocol can use the source address and/or destination address to identify if the payload is intended for a particular panel reading the message. In some forms, the panel can be configured to accept or discard a message based on whether the payload is intended for the particular panel reading the message or not.

The "OP CODE" value includes a fixed identifier provided in the form of a proprietary code (e.g., OP CODE: 0xA5=Protocol Legacy, OP CODE: 0x10=Protocol SCG=CHLOR, OP CODE: 0xA1=Protocol Open, OP CODE: 0xA6=Protocol Legacy Extended, etc.). The "OP CODE" is an identifier for a type of message. The OP CODE value can be used by the protocol to redirect the message to the respective communication module (e.g., pumps, chemical dispensers or sanitizers, heaters, discovery panels, etc.). The communication modules are objects configured to process the "DATA" frame.

The "DATA LENGTH" value includes the size of the [data=packet]. In some aspects, the data length size can be between 0 to 48 bytes.

The "DATA=PACKET" value includes the actual payload in the protocol modules to be transmitted. The data packet value(s) can be provided in the form of an array of bytes matching the structure associated with the OP-CODE.

The "CHECK SUM" value includes a checksum value with 2 bytes and a sigma (e.g., the aggregated value of all bytes on the (data=packet)). The check sum value can be used with the protocol to validate that the data packet is not corrupted. In one example, the protocol validates the check sum value by recalculating the DATA=PACKET and comparing it with the CHECK-SUM value.

In one example, the automatic discovery and identification process can occur when the server initializes communication to discover sub-panels or components at system startup or reboot. In some embodiments, this process may also be referred to as Address Resolution Protocol. In one embodiment, the data packet of the payload includes 9 bytes and can be generated from the primary panel 102. The data packet can be provided in the form of Packet Fields including a Command (e.g., 1 byte: 0x40); a Sequence (e.g., 1 byte: current primary panel sequence #); a Session (e.g., 1 byte: current primary panel session #); and a MAC Address (e.g., 6 bytes: primary panel MAC address). The data packet can also have Payload Fields including a Source address (e.g., 1 byte: 0x10 primary panel address), and a Destination Address (e.g., 1 byte: 0x16 broadcast)). The data Packet of the payload can be provided in the form of a message with the format shown in exemplary Table 3:

TABLE 3

| PACKET | | | |
|---|---|---|---|
| Command | Sequence | Session # | MAC Address |
| 1 Byte | 1 Byte | 1 Byte | 6 Byte |

The primary panel 102 receives an identification response from the one or more secondary panels 106 or the one or more pool components 104 in response to the discovery message at step 306. When the one or more secondary panels 106 or the one or more pool components 104 intercepts the discovery message broadcast by the primary panel 102, the one or more secondary panels 106 or the one or more pool components 104 can respond to the discovery message through the identification response. In some embodiments, the identification response can include a frame comprising a Preamble and a Payload, and the Payload can include a data Packet, similar to the discovery message.

In some embodiments, the Packet of the identification response is provided in the form of a message in the format shown in exemplary Table 4:

TABLE 4

| PACKET | | | | | |
|---|---|---|---|---|---|
| Command | Sequence | Session # | Status | Type | MAC Address |
| 1 Byte | 1 Byte | 1 Byte | 1 Byte | 1 Byte | 6 Byte |

The data Packet fields can be provided in the form of 11 bytes generated by the secondary panels. The data Packet fields can include a Command (e.g., 1 byte: 0x41); a Sequence (e.g., 1 byte: current primary panel sequence #); a Session (e.g., 1 byte: current primary panel session #); a Status (e.g., 1 byte for secondary panel status); a Type (e.g., 1 Byte for secondary panel type), and a MAC Address (e.g., 6 bytes: secondary panel MAC address). The Payload fields can include a Source address (e.g., 1 byte: secondary panel address); and a Destination Address (e.g., 1 byte: 0x10 primary panel Address). In some embodiments, the Status field can include: "0" for unknown, "1" for assigned address, or "2" for need sub-panel address.

Further, the one or more secondary panels 106 or the one or more pool components 104 can be discovered by the primary panel 102 when the identification response is received from the one or more secondary panels 106 or the one or more pool components 104. In some embodiments, when the identification response is not received from the one or more secondary panels 106 and/or the one or more pool components 104, the one or more secondary panels 106 and/or the one or more pool components 104 is undiscovered by the primary panel 102.

At step 308, the primary panel 102 can update a discovery status for each of the one or more secondary panels 106 and/or the one or more pool components 104 in response to the identification response. In some embodiments, the discovery status for the each of the one or more secondary panels 106 and/or the one or more pool components 104 correspond- to an online status or an offline status for each device. The online status refers to the status of a secondary panel 106 and/or a pool component 104 that is connected to the primary panel 102. The connection is considered online if the connection between the secondary panel 106 or the pool component 104 and the primary panel 102 is intact, or active. The secondary panels 106 or the pool components 104 that are still connected to the primary panel 102 and responded to the discovery message by transmitting the identification response, are known as a "discovered panel/device" and are assigned an "online" discovery status. The offline status can refer to the status of a secondary panel 106 or a pool component 104 that is disconnected from the primary panel 102. The disconnection of the secondary panel 106 or the pool component 104 from the primary panel 102 may be due to wiring removal, wire displacement, short-circuit, or other disruption to a wired communication connection between the secondary panel 106 or the pool component 104 and the primary panel 102. The disconnection of the secondary panel 106 or the pool component 104 from the primary panel 102 may be a result of an antenna error, an internet error, a network error, or other such disruption to a wireless communication connection between the secondary panel 106 or the pool component 104 and the primary panel 102 using a wireless protocol. The secondary panels 106 or the pool components 104 that are not connected to the primary panel 102 or have not responded to the discovery message are known as "undiscovered panel/devices" and are assigned an "offline" discovery status.

In some embodiments. the discovery status is updated to be the online status for each of the discovered secondary panels and/or discovered pool components when the identification response is received from the discovered secondary panels and/or the discovered pool components.

In other embodiments. the discovery status is updated to the offline status for each of the undiscovered secondary panels and/or undiscovered pool components when the identification response is not received from the undiscovered secondary panels and/or the undiscovered pool components.

The updates to the discovery status to the online status or the offline status are maintained and updated by the primary panel 102 based on the identification response. The updates can be executed by the primary panel 102 at a pre-defined time interval (e.g., every 30 minutes). In an alternative embodiment, the updates can be executed by the primary panel 102 at random time intervals, upon the occurrence of an event (e.g., installation of a new secondary panel and/or a new pool component), or upon removal of a secondary panel 106 and/or a pool component 104.

The primary panel 102 can update the discovery status to the online status or to the offline status for each of the discovered (e.g., online) or the undiscovered (e.g., offline) secondary panels 106 and/or pool components 104, as illustrated in exemplary Table 5. In some forms, the discovery status can be provided in the form of a lookup table.

In the illustrative example shown in Table 5, the one or more secondary panels 106 and the one or more pool components 104 have an online discovery status before the exemplary method 300 is implemented. It will be understood by those skilled in the art that other configurations with system components of different discovery statuses are possible.

TABLE 5

| Device/<br>Panel Name | MAC Address | Assigned<br>Address<br>ID | Type | Discovery<br>Status | Port<br>(or Wireless<br>ID) of<br>Primary<br>Panel |
|---|---|---|---|---|---|
| First Secondary Panel 106A | a1:21:b2:12:22:31 | 32 | Indoor Control Panel | Online | A |
| Second Secondary Panel 106B | b1:21:b2:12:22:32 | 36 | Wireless Control Panel | Online | B |
| Third Secondary Panel 106C | c1:21:b2:12:22:33 | 40 | Expansion Control Panel | Online | A |
| Fourth Secondary Panel 106D | D1:41:d2:d3:33:44 | 17 | Indoor Control Panel | Online | B |
| First pool component 104A | N/A | 1 | Pump | Online | A |
| Second pool component 104B | N/A | 2 | Heater | Online | A |
| Third pool component 104C | N/A | 3 | Water Chlorine Monitoring/ Controlling Device | Online | B |

TABLE 5-continued

| Device/ Panel Name | MAC Address | Assigned Address ID | Type | Discovery Status | Port (or Wireless ID) of Primary Panel |
|---|---|---|---|---|---|
| Fourth pool component 104D | N/A | 1 | Water Chemistry Monitoring/ Controlling Device | Online | B |

Exemplary Table 6 shows that the third secondary panel 106C and the fourth secondary panel 106D have the online discovery status while the first secondary panel 106A and the second secondary panel 106B are disconnected from the primary panel 102, thus, the discovery status associated with the panels is updated to be offline. The third secondary panel 106C and the fourth secondary panel 106D are "discovered secondary panels" since the identification response is received from these panels. The first secondary panel 106A and the second secondary panel 106B are "undiscovered secondary panels" since the identification response is not received from these panels.

Similarly, in this non-limiting example, the first pool component 104A and the second pool component 104B have the online discovery status indicating the panels are connected since the identification response is received from these panels. The third pool component 104C and the fourth pool component 104D have been disconnected from the primary panel, thus, the discovery status is updated to offline since the identification response is not received from these panels. The first pool component 104A and the second pool component 104B are "discovered pool components" while the third pool component 104C and the fourth pool component 104D are "undiscovered pool components."

Although Exemplary Tables 5 and 6 list a limited number of secondary panels 106, any number and different types of pool components 104, secondary panels 106, sub-panels, or similar devices, can be connected to the primary panel 102 and thus, can be listed in these tables or otherwise discovered and identified by the system and processes described herein. While Exemplary Tables 5 and 6 also only show a port number associated with a wired communication connection, it will be understood that the system can include the wireless identification number(s) associated with a wireless communication connection.

Figure 4:
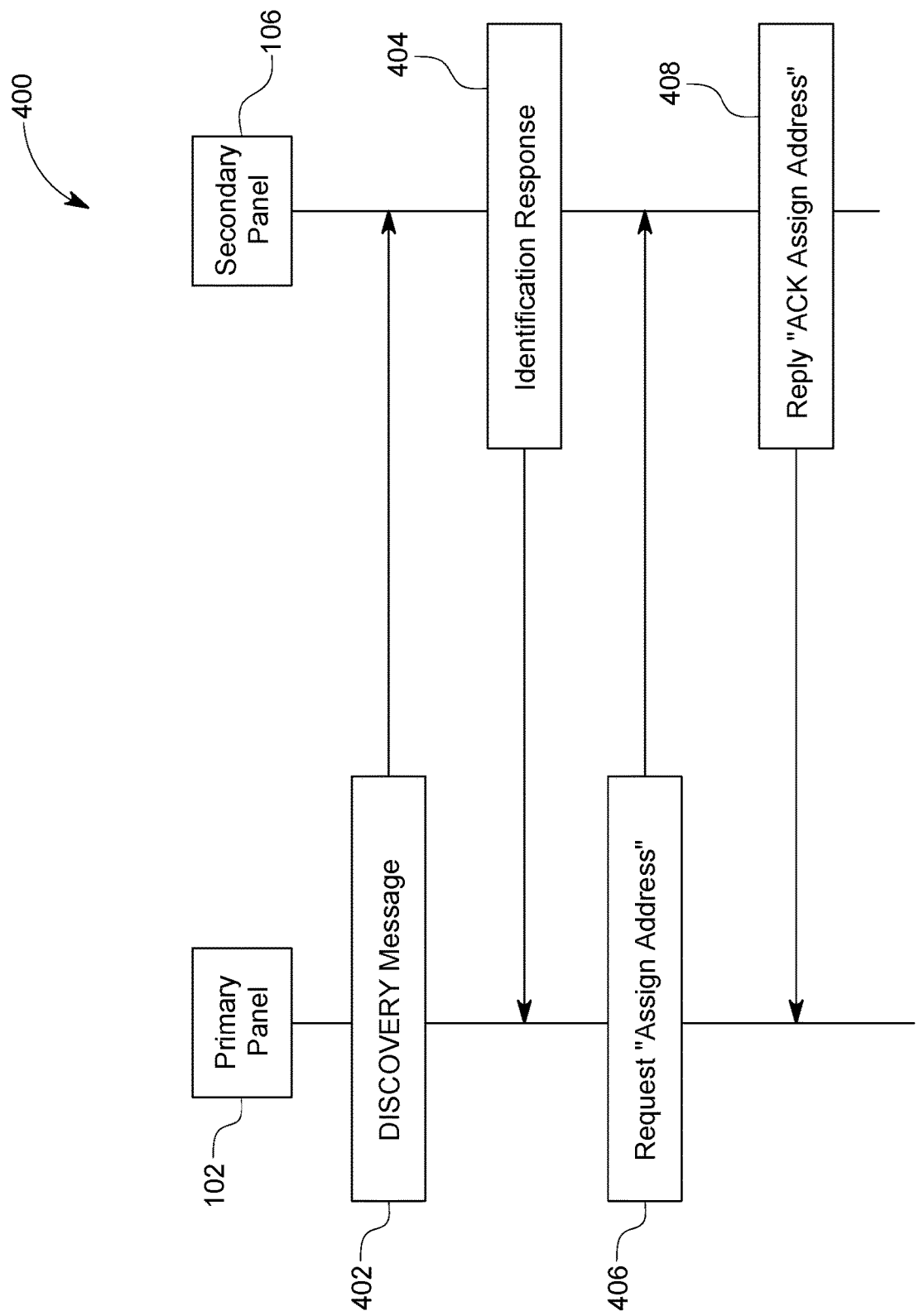
FIG. 4 is a schematic diagram for a process for the automatic discovery of secondary panels by a primary panel according to disclosed embodiments.

Referring now to FIG. 4, a signaling flow process 400 is provided for the automatic discovery of secondary panels 106 and the generation of a unique identifier by a primary panel 102, according to an embodiment. The signaling flow process 400 utilizes an address resolution protocol ("ARP") to execute the steps to send the messages 402-408. Further, the signaling flow process 400 may be initiated anytime at or after the boot time of the primary panel 102.

The primary panel 102 can broadcast the discovery message 402 to identify the one or more secondary panels 106, as explained above at step 304 of the method 300. In some forms, when the one or more secondary panels 106 intercept the broadcast discovery message 402, the secondary panels

TABLE 6

| Device/ Panel Name | Unique Identifier (e.g. MAC Address) | Assigned Address ID | Type | Discovery Status | Port (or Wireless ID) of Primary Panel 102 |
|---|---|---|---|---|---|
| First Secondary Panel 106A | a1:21:b2:12:22:31 | 32 | Indoor Control Panel | Offline | A |
| Second Secondary Panel 106B | b1:21:b2:12:22:32 | 36 | Wireless Control Panel | Offline | B |
| Third Secondary Panel 106C | c1:21:b2:12:22:33 | 40 | Expansion Control Panel | Online | A |
| Fourth Secondary Panel 106D | D1:41:d2:d3:33:44 | 17 | Indoor Control Panel | Online | B |
| First pool component 104A | N/A | 1 | Pump | Online | A |
| Second pool component 104B | N/A | 2 | Valve | Online | A |
| Third pool component 104C | N/A | 3 | Heater | Offline | B |
| Fourth pool component 104D | N/A | 1 | Light | Offline | B |

106 transmits an identification response 404 in response to the discovery message 402 to the primary panel 102 as explained at step 306 in connection with FIG. 3.

In one example, only the secondary panels 106 which are connected to the primary panel 102 respond to the discovery message 402 and transmit an identification response 404 to the primary panel 102. The rest of the secondary panels 106 that are not connected to the primary panel 102 do not respond to the discovery message 402 and thus, will not transmit the identification response 404 to the primary panel 102. Based on the identification response 404, the primary panel 102 updates a discovery status for each of the one or more secondary panels 106 as explained in connection with FIG. 3 at step 308. In a non-limiting example, if an identification response 404 is received from a particular secondary panel 106 by the primary panel 102, then the primary panel 102 can update the status to an online status and designate that particular secondary panel 106 as a "discovered secondary panel." And, if an identification response 404 is not received from a particular secondary panel 106 by the primary panel 102, then the primary panel 102 can update the discovery status to an offline status and designate that the particular secondary panel 106 is an "undiscovered secondary panel." Referring to exemplary Table 6, the third secondary panel 106C and the fourth secondary panel 106D are "discovered secondary panels" while the first secondary panel 106A and the second secondary panel 106B are "undiscovered secondary panels."

In one embodiment, the primary panel 102 generates a unique identifier 406 for the discovered secondary panels 106 which sends an identification response. In some forms, the unique identifier 406 is provided in the form of an assigned address. The primary panel 102 can automatically generate the unique identifier 406 (e.g., the assigned address) and transmit the generated unique identifier 406 to the discovered secondary panels 106. In a non-limiting embodiment, the unique identifier 406 for each of the discovered secondary panels 106 corresponds to a media access control ("MAC") address. In an exemplary embodiment, the primary panel 102 generates the unique identifier 406 for each of the discovered secondary panels 106 immediately after (or substantially immediately after) the primary panel 102 updates the status of the secondary panels 106 to the online status.

In some embodiments, the primary panel 102 transmits the generated unique identifier 406 to the discovered secondary panels 106 in a data Packet provided in the format shown in exemplary Table 7:

TABLE 7

PACKET

| Command | Sequence | Session # | Address | MAC Address |
|---------|----------|-----------|---------|-------------|
| 1 Byte  | 1 Byte   | 1 Byte    | 1 Byte  | 6 Byte      |

In some embodiments, the data Packet Fields can include a Command (e.g., 1 byte: 0x42); a Sequence (e.g., 1 byte: current primary panel sequence #); a Session (e.g., 1 byte: current primary panel session #); an Address (e.g., 1 byte: assigned address for secondary panel); a MAC Address (e.g., 6 byte: primary panel MAC address). In some embodiments, the Payload Fields can include a Source address (e.g., 1 byte: 0x10 primary panel address); and a Destination Address (e.g., 1 byte: 0x16 broadcast).

When the discovered secondary panels 106 receive the unique identifier 406 from the primary panel 102, the discovered secondary panels 106 save and implement the unique identifier 406 to configure themselves. The discovered secondary panels 106 may also generate and transmit an acknowledgment response 408 message to the primary panel 102. In some embodiments, the acknowledgment response 408 can information confirming that the secondary panel 106 has received, saved, and implemented the unique identifier 406. The primary panel 102 is configured to receive and process the acknowledgment response 408 message.

In some embodiments, the discovered secondary panels 106 generate and transmit the acknowledgment response 408 message to the primary panel 102 in a data Packet provided in the format shown in exemplary Table 8:

TABLE 8

PACKET

| Command | Sequence | Session # | Address | MAC Address |
|---------|----------|-----------|---------|-------------|
| 1 Byte  | 1 Byte   | 1 Byte    | 1 Byte  | 6 Byte      |

In one embodiment, the secondary panel 106 can send the acknowledgment response 408 Packet provided in the form of 4 bytes: CMD 0x43. In one embodiment, the data Packet fields can include: a Command (e.g., 1 byte: 0x43); a Sequence (e.g., 1 byte: current primary panel sequence #); a Session (e.g., 1 byte: current primary panel session #); an Address (e.g., 1 byte: secondary panel status); and a MAC Address (e.g., 6 bytes: secondary panels MAC address). The Payload fields can include: a Source address (e.g., 1 byte: assigned secondary panel address); and a Destination Address (e.g., 1 byte: 0x10 primary panel address).

Figure 5:
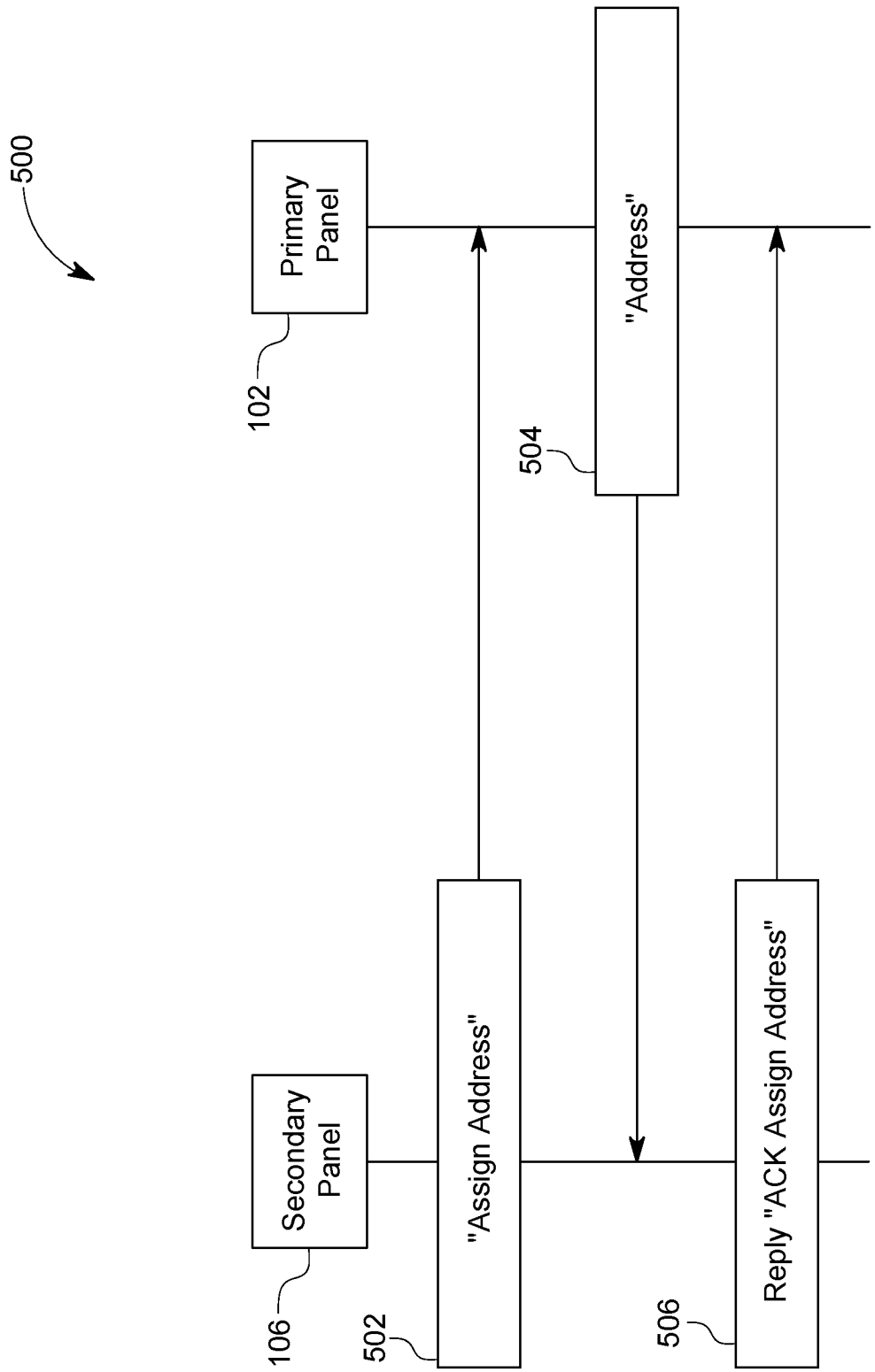
FIG. 5 is a schematic diagram for a process for requesting the generation of a unique identifier by the discovered secondary panels according to disclosed embodiments.

Referring to FIG. 5, a signaling flow process 500 is provided for requesting the generation of the unique identifier 502 by discovered secondary panels 106 (see exemplary Table 6), according to an embodiment. The signaling flow process 500 utilizes a reverse address resolution protocol ("RARP") to execute the steps to send messages 502-506. In some aspects, the signaling flow process 500 can start at a startup of the secondary panels 106 or at a boot time of the secondary panels 106.

One or more discovered secondary panels 106 transmits a request to the primary panel 102. The request includes a request for the primary panel 102 to assign a unique identifier 502 to the secondary panel 106. In an embodiment, the unique identifier 502 for each of the discovered secondary panels 106 corresponds to the MAC address. In an exemplary embodiment, the primary panel 102 generates the unique identifier 502 for each of the discovered secondary panels 106 when the primary panel 102 receives the request from the discovered secondary panels 106.

In some embodiments, the one or more discovered secondary panels 106 transmit the request to a primary panel 102 for assigning the unique identifier 502 in a data Packet provided in the format shown in exemplary Table 9:

TABLE 9

PACKET

| Command | Sequence | MAC Address |
|---------|----------|-------------|
| 1 Byte  | 1 Byte   | 6 Bytes     |

In one embodiment, the data Packet fields can include: a Command (e.g., 1 byte: 0x44); a Sequence (e.g., 1 byte: current secondary panel sequence #); and a MAC Address (e.g., 6 byte: secondary panel MAC address). The Payload fields can include: a Source Address (e.g., 1 byte: 0x16 secondary panel address); and a Destination Address (e.g., 1 byte: 0x10 primary panel address).

The primary panel 102 receives the request from the secondary panel(s) 106 and generates a unique identifier 504, or an assigned address, for the discovered secondary panels 106. The primary panel 102 transmits the generated unique identifier 504 to the one or more discovered secondary panels 106.

The one or more discovered secondary panels 106 receives the generated unique identifier 504 from the primary panel 102 and can automatically self-configure by saving and implementing the generated unique identifier 504. The one or more discovered secondary panels 106 can transmit an acknowledgment response 506 to the primary panel 102 to confirm the receipt of the generated unique identifier 504 and the self-configuration process. In one embodiment, the acknowledgment response 506 message sent to the primary panel 102 by the discovered secondary panels 106 can be provided in the data Packet format shown in the exemplary Table 8.

In one embodiment, when the secondary panels 106 are powered on before the primary panel 102 is powered on or re-booted, the secondary panels 106 can be configured to send the request for an assigned address 502 at a pre-defined time interval (e.g., every 10 seconds) from a time the system is booted until the RARP protocol is completed. In some forms, the secondary panel(s) 106 may be configured to detect when the primary panel 102 is powered on and can transmit the request for an assigned address 502 when the secondary panel 106 detects that the primary panel 102 is powered on.

Figure 6:
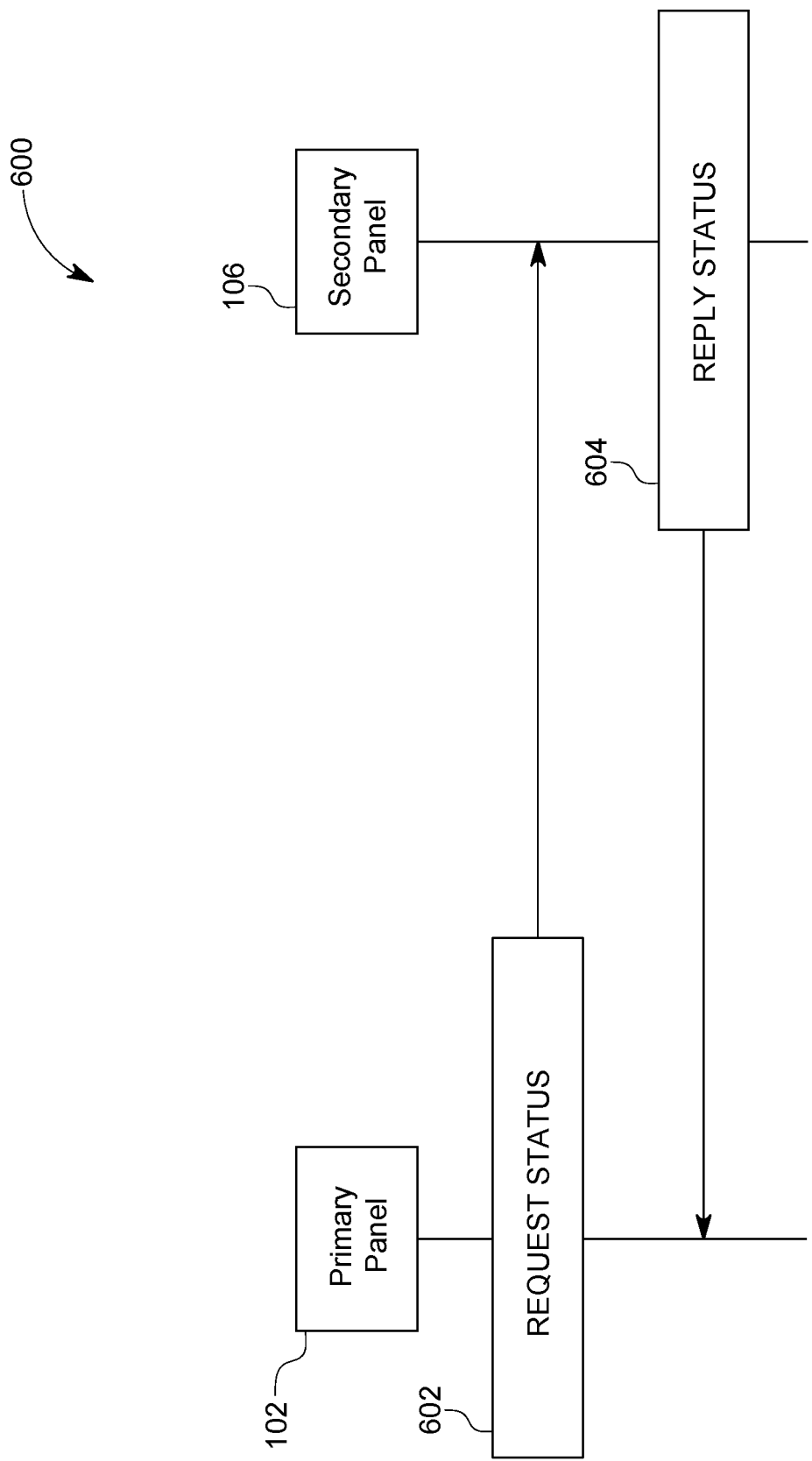
FIG. 6 is a schematic diagram for a process for checking an alive status of secondary panels by a primary panel, according to disclosed embodiments.

Referring now to FIG. 6, a signaling flow process 600 is provided for checking the alive status of the secondary panels 106 by the primary panel 102, according to an embodiment. In some aspects, the primary panel 102 can send a request signal to each of the secondary panel(s) 106 and maintain an address status table according to the response signals received from the secondary panel(s) 106.

The primary panel 102 broadcasts or otherwise transmits a request status 602 (e.g., a "ping") to each of the one or more secondary panels 106. In one embodiment, the request status 602 is designed for determining whether the one or more secondary panels 106 are "alive" or not. It will be understood that "alive" can include an online status and/or electrically connected to the system 100. In some forms, the request status 602 is transmitted at a pre-defined time interval (e.g., every 20-30 seconds) from the primary panel 102 to the secondary panels 106.

In some embodiments, the request status 602 (e.g., "ping") is transmitted by the primary panel 102 to the one or more secondary panels 106 in a data Packet provided in the format shown in exemplary Table 10:

TABLE 10

PACKET

| Command | Sequence | Session # | Address | MAC Address |
|---------|----------|-----------|---------|-------------|
| 1 Byte  | 1 Byte   | 1 Byte    | 1 Byte  | 6 Byte      |

In one embodiment, the primary panel 102 is the signal Source and the request status 602 ping is provided in the form of 9 bytes: 0x45 CMD. In one embodiment, the data Packet fields can include: a Command (e.g., 1 byte: 0x45); a Sequence (e.g., 1 byte: current primary panel sequence #); a Session (e.g., 1 byte: current primary panel session #); an Address (e.g., 1 byte: current secondary panel address); and a MAC address (e.g., 6 bytes: primary panel MAC address). In some embodiments, the Payload fields can include: a Source address (e.g., 1 byte: 0x10 primary panel address); and a Destination address (1 byte: *specific secondary panels).

In response to receiving the request status 602, each of the one or more secondary panels 106 can transmit a reply response 604 (e.g., a "pong") status including the most recent assigned unique identifier 504 (see FIG. 5) associated with the specific secondary panel 106 to the primary panel 102. Once the recently assigned unique identifier 504 of each of the one or more secondary panels 106 is received, the primary panel 102 can update the alive status associated with the discovered component and store the most recently assigned unique identifier in a table (see Exemplary Tables 6 and 7). In an exemplary embodiment, the alive status refers to a status showing whether a particular pool component 104 or a secondary panel 106 is installed or otherwise connected to the connected aquatic system.

In some embodiments, the reply response 604 (e.g., the "pong") status transmitted by the one or more secondary panels 106 to the primary panel 102 can be provided in the form of a data packet provided in the format shown in exemplary Table 11:

TABLE 11

PACKET

| Command | Sequence | Session # | Address |
|---------|----------|-----------|---------|
| 1 Byte  | 1 Byte   | 1 Byte    | 1 Byte  |

In some embodiments, the secondary panel 106 is the reply signal Source provided in the form of 10 bytes: 0x46 CMD. The data Packet fields may include: a Command (e.g., 1 byte: 0x46); a Sequence (e.g., 1 byte: current primary panel sequence #); a Session (e.g., 1 byte: current primary panel session #); and an Address (e.g., 1 byte: current secondary panel assigned address). The Payload fields can include: a Source Address (e.g., 1 byte: secondary panel address); and a Destination Address (1 byte: 0x10 primary panel address).

If any of the secondary panels 106 does not generate and/or transmit the reply response 604 (or a "pong") to the request status 602 (or a "ping"), then the primary panel 102 will retry sending the request status 602. In some forms, the primary panel 102 may retry twice. After the subsequent attempts, if the secondary panels 106 do not transmit the reply response 604 then the primary panel 102 may remove that particular secondary panel 106 from the routing table.

Figure 7:
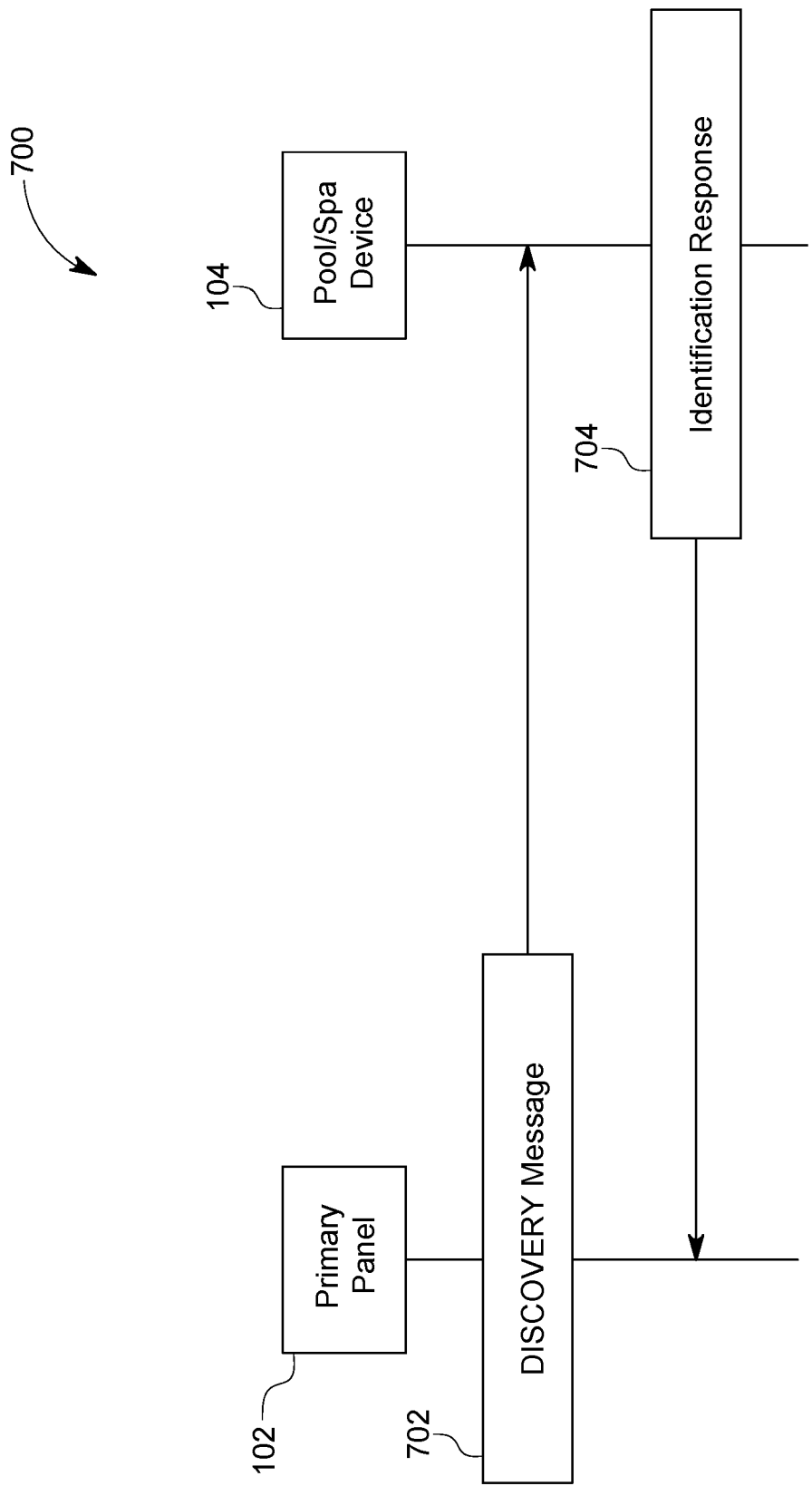
FIG. 7 is a schematic diagram for a process for the automatic discovery of pool components by a primary panel, according to disclosed embodiments.

Referring to FIG. 7, a signaling flow process 700 is provided for the automatic discovery of pool components 104 by a primary panel 102, according to an embodiment.

The primary panel 102 broadcasts a discovery message 702 to identify the one or more pool components 104 that are connected to the primary panel 102 of the connected aquatic system 100. The discovery message 702 broadcasted by the primary panel 102 can be provided in the same format as the data Packet shown in exemplary Tables 1, 2, and 3.

The primary panel 102 can receive an identification response 704 from the one or more pool components 104. The one or more pool components 104 can generate and transmit the identification response 704 in response to receiving and processing the discovery message 702 from the primary panel 102. The identification response 704 received by the primary panel 102 can be provided in the same format as shown in exemplary Table 4. The primary panel 102 can update a status associated with each of the pool components 104 in response to receiving the identification response 702 from the one or more pool components 104. For example, when the primary panel 102 receives the identification response 704 from a pool component 104, the primary panel can update the status associated with the pool component 104 to "discovered." In some forms, when the primary panel 102 does not receive the identification response 704 from the one or more pool components 104, the primary panel can identify the pool component(s) 104 as "undiscovered." In the non-limiting example shown in Exemplary Table 6, the first pool component 104A and the second pool component 104B are "discovered pool components" while the third pool component 104C and the fourth pool component 104D are "undiscovered pool components."

Figure 8:
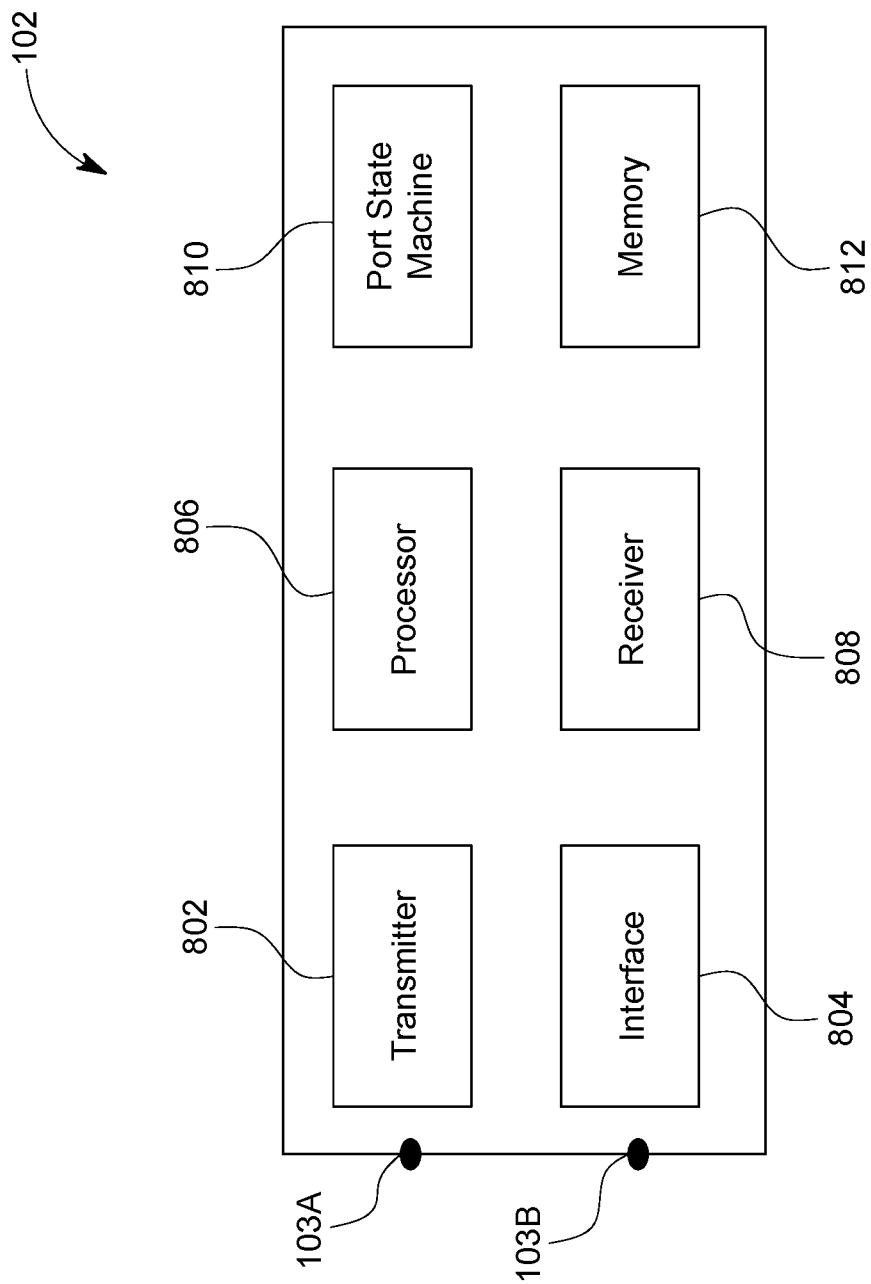
FIG. 8 is a schematic diagram of a primary panel, according to disclosed embodiments.

Referring to FIG. 8, a block diagram of a primary panel 102 is provided, according to an embodiment. The primary panel 102 can be provided in the form of a control system including, but not limited to, a transmitter 802, an interface 804, a processor 806, a receiver 808, a port state machine 810, and a memory 812.

The transmitter 802 can be designed to broadcast or otherwise transmit the discovery message 702 (see FIG. 7) to identify one or more secondary panels 106 and/or one or more pool components 104 connected to the primary panel 102. The transmitter 802 can also be designed to transmit a unique identifier generated for each of the discovered secondary panels 106, as described in more detail in connection with FIGS. 4 and 5.

The interface 804 can be designed to receive user input, process information, generate a display, and transmit information to the remote device or other display. Any information such as a discovery status or a status of each of the communication interfaces of the primary panel 102, the one or more secondary panels 106, and/or the one or more pool components 104 can be generated on the interface 804. The interface 804 may include, or otherwise be communicatively coupled to, a screen or similar display interface.

The processor 806 can be designed to execute instructions to update a discovery status for each of the one or more secondary panels 106 and the one or more pool components 104. The primary panel 102 can execute instructions to update the discovery status in response to receiving the identification response 704 from each of the one or more secondary panels 106 and/or the one or more pool components 104.

The receiver 808 can be designed to receive an identification response 704 (see FIG. 7) from the one or more secondary panels 106 and/or the one or more pool components 104. The one or more secondary panels 106 and/or the one or more pool components 104 can generate and transmit the identification response 704 in response to receiving and processing the discovery message 702. The receiver 808 can be designed to receive a request from the one or more secondary panels 106 for assigning addresses by generating a unique identifier, as explained in connection with FIGS. 4 and 5. In some embodiments, the receiver 808 and the transmitter 802 can be provided in the form of a transceiver device designed to both receive and transmit information and/or data packets.

The port state machine 810 is designed to determine the latest status of each communication interface 103A, 103B of the primary panel 102, the one or more secondary panels 106, and/or the one or more pool components 104. The port state machine 810 can determine the latest status based on a current or a most recent load information retrieved from the first communication interface 103A and the second communication interface 103B of the primary panel 102.

The memory 812 is configured to store or save data for the primary panel 102, the secondary panels 106, and/or the one or more pool components 104. The memory 812 can store or save configuration data, live data, discovery data, status data, the unique identifier generated for each of the discovered secondary panels 106 and/or pool components 104, other data, or a combination thereof.

Figure 9:
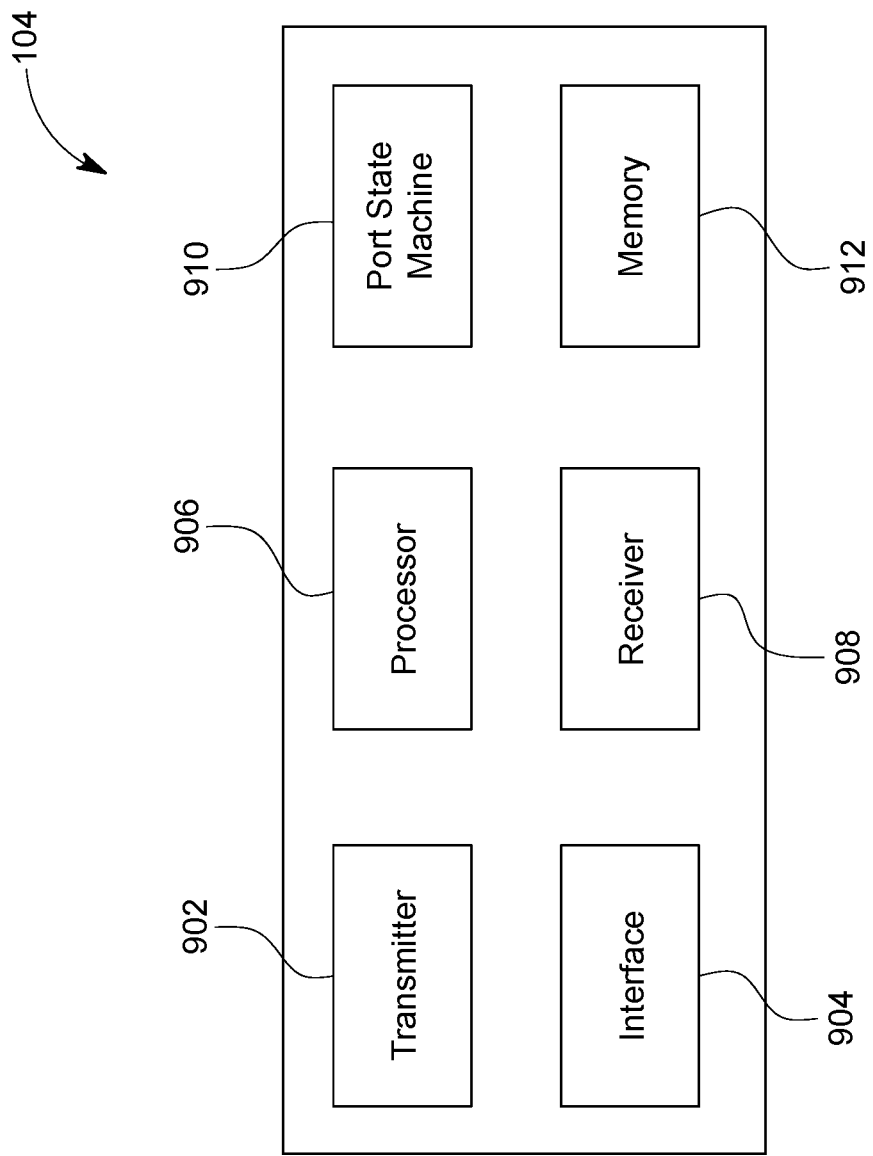
FIG. 9 is a schematic diagram of a pool component, according to disclosed embodiments.

Referring to FIG. 9, a block diagram of a control system of the pool component 104 is depicted. The control system of the pool component 104 includes, but is not limited to, a transmitter 902, an interface 904, a processor 906, a receiver 908, a port state machine 910, and a memory 912.

The. transmitter 902 can be designed to transmit a response status 604 (or a "pong") to the primary panel 102, as described in more detail in connection with FIG. 6. The. transmitter 902 can also be designed to transmit the identification response 704 in response to the discovery message 702 received from a primary panel 102 (see FIG. 7).

The interface 904 can be designed to receive user input, process information, generate a display, and transmit information to the remote device or other display. The interface 904 can be used to display information including the discovery status of the pool component 104, a status of the communication interface associated with the pool component 104, operating parameters associated with the pool equipment 104, or other information. The interface 904 may include, or otherwise be communicatively coupled to, a screen or similar display interface.

The processor 906 can be designed to update the status (e.g., connected or not connected) of communication interfaces of the pool component(s) 104. In some forms, the processor 906 can be designed to update the status of the one or more pool components 104 in response to receiving the identification response 704 (see FIG. 7) from the pool component 104.

The receiver 908 can be designed to receive a discovery message 702 from a primary panel 102, as described in more detail in connection with FIG. 7. Moreover, the receiver 908 can be designed to receive a request status 602 (e.g., a "ping") from the primary panel 102, as described in more detail in connection with FIG. 6. In some embodiments, the receiver 908 and the transmitter 902 can be provided in the form of a transceiver device designed to both receive and transmit information and/or data packets.

The port state machine 910 is designed to determine the latest status of each communication interface 103A, 103B of the primary panel 102, the one or more secondary panels 106, and/or the one or more pool components 104. The port state machine 910 can determine the latest status based on a current or a most recent load information retrieved from the first communication interface 103A and the second communication interface 103B of the primary panel 102.

The memory 912 is configured to store or save data for the primary panel 102, the secondary panels 106, and/or the one or more pool components 104. The memory 912 can store or save configuration data, live data, discovery data, status data, the unique identifier generated for each of the discovered secondary panels 106 and/or pool components 104, other data, or a combination thereof.

Figure 10:
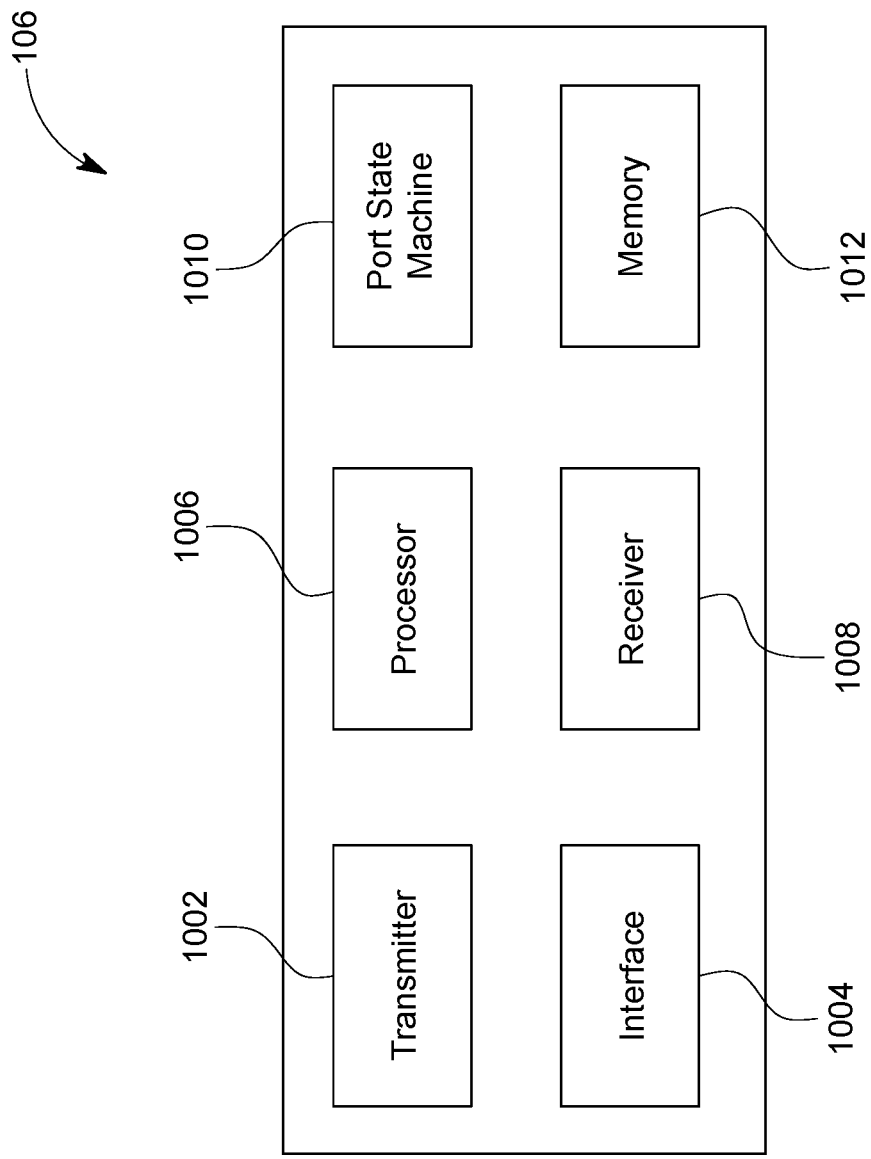
FIG. 10 is a schematic diagram of a secondary panel, according to disclosed embodiments.

Referring now to FIG. 10, a block diagram of a control system of the secondary panel 106 is shown, according to an embodiment. The control system of the secondary panel 106 can include but is not limited to, a transmitter 1002, an interface 1004, a processor 1006, a receiver 1008, a port state machine 1010, and a memory 1012.

In some embodiments, the transmitter 1002 can be designed to transmit a request to the primary panel 102 to provide a unique identifier 502, as described in more detail in connection with FIG. 5. In some forms, the transmitter 902 can be designed to transmit an identification response 704 to the primary panel 102 in response to receiving the discovery message 704, as described in more detail in connection with FIG. 7. In some aspects, the transmitter 902 can designed to transmit a reply response 604 in response to receiving a request status 602 from the primary panel 102.

The interface 1004 can be designed to receive user input, process information, generate a display, and transmit information to the remote device or other display. The interface 1004 can be used to display information including the discovery status of the secondary panel 106, a status of the communication interface associated with the secondary panel 106, operating parameters associated with the secondary panel 106, or other information. The interface 1004 may include, or otherwise be communicatively coupled to, a screen or similar display interface.

The processor 1006 can be designed to update the status of the communication interface in response to the identification response. The update of the status of the communication interfaces can be executed by the processor 1006 and stored in the memory 1012 of the secondary panel 106.

The receiver 1008 can be designed to receive the discovery message 702 from a primary panel 102. Furthermore, the receiver 1008 can be designed to receive the generated unique identifier 406 from the primary panel 102, as described in more detail in connection with FIGS. 3-7. In some embodiments, the receiver 1008 and the transmitter 1002 can be provided in the form of a transceiver device designed to both receive and transmit information and/or data packets.

In one embodiment, the port state machine 1010 can be designed to determine the latest status of each communication interface of the secondary panel 106. The latest status can be determined by the port state machine 1010 based on current or most recent load information or connection of communication interfaces of the secondary panel 106 with the first communication interface 103A and the second communication interface 103B of the primary panel 102.

The memory 1012 can be designed to store or save data associated with the primary panel 102, the secondary panels 106, the pool components 104, or a combination thereof. The data stored in the memory 1012 can include but is not limited to, configuration data, live data, discovery data, the most recent unique identifier received from the primary panel 102, and other information.

The present disclosure offers multiple technical advantages over existing technologies. In particular, the system and method provided automatically discover and configure pool devices (e.g., pool components and secondary panels) without manual input by a user. The system and method provided also automatically detects and identifies the devices connected to a primary panel. The processes described herein can save a user or technician time and system downtime that would otherwise be involved in manually discovering or configuring any pool devices connected to a primary panel. The system and method provided also automatically discover and configure any pool devices, that are still connected to or have been disconnected from a primary panel, which can save time and expense related to dispatching a technician to physically identify the pool devices failing to communicate to the primary panel. The system and method also provide the automatic discovery and configuration of pool devices, which eliminates user manuals or documentation for instructions on how to establish connections and configure the pool devices. Printed user manuals can increase waste and be tedious and difficult for typical pool users to maintain and/or understand.

In some embodiments, the discovery of the pool devices and the autoconfiguration of these devices can be done automatically without any user input based on one or more autoconfiguration processes. The automatic configuration process can further include, in some embodiments, automatic scheduling or adjusting component settings to improve the efficiency or performance of the overall system. In some embodiments, the connected aquatic system may automatically configure a newly discovered connected device to have the same baseline operating parameters as other connected devices of the same type, as detected by the system according to the processes described herein. In some embodiments, the baseline operating settings for an initial configuration of the pool device may be retrieved from a local memory device, a server, a remote database, a manufacturer database, a third-party application, or a combination thereof. In some aspects, the automatic discovery and/or configuration of the pool devices can be executed using one or more machine learning models or other advanced artificial intelligence processes.

In another embodiment, the automatic discovery and/or automatic configuration processes described herein can be completed on a mobile application, a WiFi module connected between the primary panel 102 and the pool component(s) 104 and/or the secondary panel(s) 106, or similar alternate connection embodiment.

In some embodiments, if the pool component 104 and/or the secondary panels 106 cannot be automatically discovered by sending and receiving the data packets as described herein, the connected system 100 can execute alternate signal processing techniques to otherwise automatically detect and configure the pool components 104 and/or the secondary panels 106. In one non-limiting embodiment, the pool lights 228 may be automatically detected and configured according to this alternate embodiment.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. An automatic discovery method for automatically discovering and configuring one or more pool devices of a connected aquatic system, the method comprising:
broadcasting a discovery message to identify the one or more pool devices connected to a primary panel, using the primary panel to broadcast the discovery message to the one or more pool devices, wherein the discovery message includes a house parameter to identify a physical location of the primary panel;
receiving and processing the discovery message by the one or more pool devices;
generating and transmitting an identification response from the one or more pool devices;
receiving the identification response from the one or more pool devices using a receiver of the primary panel;

updating a discovery status for each of the one or more pool devices using a processor of the primary panel; and storing the discovery status for each of the one or more pool devices in a memory of the primary panel.

2. The automatic discovery method of claim 1, wherein the one or more pool devices include a pool component, a secondary panel, or a combination thereof.

3. The automatic discovery method of claim 2, wherein the pool component includes a pool pump, a booster pump, a filter, a solar controller, a heater, a sanitizer, a water quality monitor, a salt/chlorine generator, a pH regulator, a valve, a pool cleaner, a pool skimmer, a pool light, a water feature, a pool drain, or a combination thereof.

4. The automatic discovery method of claim 2, wherein the secondary panel is an indoor control panel, an expansion control panel, a wireless control panel, or a combination thereof.

5. The automatic discovery method of claim 1, wherein the discovery status associated with a particular pool device is updated to "discovered" when the identification response is received from the particular pool device.

6. The automatic discovery method of claim 5, wherein the discovery status associated with the particular pool device that is "discovered" includes an "online" status.

7. The automatic discovery method of claim 1, wherein the discovery status associated with a particular pool device is updated to "undiscovered" when the primary panel does not receive the identification response from the particular pool device in response to broadcasting the discovery message to the particular pool device.

8. The automatic discovery method of claim 7, wherein the discovery status associated with the particular pool device that is "undiscovered" includes an "offline" status.

9. A connected aquatic system designed to automatically discover and configure one or more pool devices of the connected aquatic system, the connected aquatic system comprising:
   a primary panel comprising:
      a transmitter configured to broadcast a discovery message to identify the one or more pool devices connected to the primary panel, wherein the discovery message includes a house parameter to identify a physical location of the primary panel;
      a receiver configured to receive an identification response from the one or more pool devices connected to the primary panel;
      a processor configured to update a discovery status for each of the one or more pool devices in response to receiving the identification response; and
      a memory configured to store the discovery status for each of the one or more pool devices; and
   the one or more pool devices include a pool component, a secondary panel, or a combination thereof.

10. The connected aquatic system of claim 9, wherein the primary panel is an outdoor control panel.

11. The connected aquatic system of claim 9, wherein the primary panel further comprises one or more communication interfaces designed to communicatively couple the primary panel to the one or more pool devices.

12. The connected aquatic system of claim 11, wherein the one or more communication interfaces are utilized for load balancing.

13. The connected aquatic system of claim 9, further comprising a remote device operatively coupled to the primary panel, wherein the remote device is configured to remotely control the one or more pool devices of the connected aquatic system.

14. The connected aquatic system of claim 13, wherein the remote device includes a mobile device, a smartwatch, a tablet, a computer, a laptop, or a combination thereof.

15. An automatic discovery method for automatically discovering and configuring one or more pool devices of a connected aquatic system, the method comprising:
   broadcasting a discovery message to identify the one or more pool devices connected to a primary panel, using the primary panel to broadcast the discovery message to the one or more pool devices, wherein the discovery message includes a house parameter to identify a physical location of the primary panel;
   generating and transmitting an identification response from the one or more pool devices in response to receiving the discovery message;
   updating a discovery status for each of the one or more pool devices using the primary panel, wherein the discovery status for the one or more pool devices that generated and transmitted the identification response is discovered pool devices;
   generating a unique identifier for each of the discovered pool devices using the primary panel;
   transmitting the unique identifier to each of the discovered pool devices using the primary panel; and
   receiving an acknowledgment message from the discovered pool devices.

16. The automatic discovery method of claim 15 further comprising:
   storing the discovery status for each of the one or more pool devices in a memory of the primary panel.

17. The automatic discovery method of claim 15, further comprising:
   automatically configuring each of the discovered pool devices by implementing the unique identifier received from the primary panel.

18. The automatic discovery method of claim 15, further comprising:
   broadcasting a request status to the one or more pool devices to check whether or not the one or more pool devices is alive;
   receiving a reply status from the one or more pool devices in response to the request status using the primary panel; and
   updating an alive status based on the reply status using the primary panel.

19. The automatic discovery method of claim 15, wherein the unique identifier for each of the discovered pool devices corresponds to a media access control (MAC) address.

20. The automatic discovery method of claim 15, further comprising:
   balancing a load on the primary panel based on a number of the one or pool devices connected to a first interface of the primary panel and a second interface of the primary panel.

* * * * *